US009657119B2

(12) United States Patent
Lee et al.

(10) Patent No.: US 9,657,119 B2
(45) Date of Patent: May 23, 2017

(54) PREPARATION METHOD OF A SUPPORTED METALLOCENE CATALYST

(71) Applicant: LG CHEM, LTD., Seoul (KR)

(72) Inventors: Seung Mi Lee, Daejeon (KR); Yi Young Choi, Daejeon (KR); Ki Soo Lee, Daejeon (KR); Eun Kyoung Song, Daejeon (KR); Heon Yong Kwon, Daejeon (KR); Min Seok Cho, Daejeon (KR); Dae Sik Hong, Daejeon (KR); Hyun Jee Kwon, Daejeon (KR); Yu Taek Sung, Daejeon (KR); Dong Hoon Jeong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/033,866

(22) PCT Filed: Nov. 28, 2014

(86) PCT No.: PCT/KR2014/011580
§ 371 (c)(1),
(2) Date: May 2, 2016

(87) PCT Pub. No.: WO2015/080523
PCT Pub. Date: Jun. 4, 2015

(65) Prior Publication Data
US 2016/0304637 A1 Oct. 20, 2016

(30) Foreign Application Priority Data
Nov. 28, 2013 (KR) .................. 10-2013-0146473
Nov. 27, 2014 (KR) .................. 10-2014-0167732

(51) Int. Cl.
C08F 2/00 (2006.01)
C08F 4/00 (2006.01)
(Continued)

(52) U.S. Cl.
CPC ............ *C08F 110/02* (2013.01); *C08F 10/00* (2013.01); *C08F 4/65908* (2013.01);
(Continued)

(58) Field of Classification Search
CPC .... C08F 110/02; C08F 10/10; C08F 4/65908; C08F 4/65916; C08F 4/65925; C08F 2420/05
(Continued)

(56) References Cited

U.S. PATENT DOCUMENTS 5,807,800 A 9/1998 Shamshoum et al.
6,136,745 A 10/2000 Ashton et al.
(Continued)

FOREIGN PATENT DOCUMENTS

EP 0910471 B1 10/2004
JP 2007119726 A 5/2007
(Continued)

Primary Examiner — William Cheung
(74) Attorney, Agent, or Firm — Dentons US LLP

(57) ABSTRACT

The present invention relates to a preparation method of a highly active supported metallocene catalyst which can prepare a polyolefin of high bulk density. More specifically, the present invention provides a method of preparing the supported metallocene catalyst in which one or more metallocene catalysts are loaded on the silica carrier of which the inside is penetrated by more cocatalyst than the prior art and the outside is attached with a substantial amount of the cocatalyst. The catalyst according to the present invention can prepare a polyolefin polymer with improved bulk density and efficiency while maintaining its highly active catalytic characteristic.

14 Claims, 2 Drawing Sheets

(51) Int. Cl.
*C08F 110/02* (2006.01)
*C08F 10/00* (2006.01)
*C08F 4/659* (2006.01)
*C08F 4/6592* (2006.01)

(52) U.S. Cl.
CPC ...... *C08F 4/65912* (2013.01); *C08F 4/65916* (2013.01); *C08F 4/65925* (2013.01); *C08F 2420/05* (2013.01)

(58) Field of Classification Search
USPC ..................................................... 526/64, 90
See application file for complete search history.

(56) References Cited

U.S. PATENT DOCUMENTS

2012/0252991 A1* 10/2012 Kim ........................ C08F 10/00
526/114

2014/0213743 A1 7/2014 Slawinski

FOREIGN PATENT DOCUMENTS

| | | |
|---|---|---|
| KR | 1019980071236 A | 10/1998 |
| KR | 1020000023611 A | 4/2000 |
| KR | 1020010022116 A | 3/2001 |
| KR | 1020060021476 A | 3/2006 |
| KR | 10-2007-0092217 A | 9/2007 |
| KR | 100855501 B1 | 9/2008 |
| KR | 10-2009-0103251 A | 10/2009 |
| KR | 10-2010-0023278 A | 3/2010 |
| KR | 101050791 B1 | 7/2011 |
| KR | 1020110096718 A | 8/2011 |
| KR | 1020120061029 A | 6/2012 |
| KR | 1020120106812 A | 9/2012 |
| KR | 1020130027316 A | 3/2013 |
| KR | 101271055 B1 | 5/2013 |
| KR | 1020130113470 A | 10/2013 |

\* cited by examiner

Aluminium Ka1          Silicon Ka1

PREPARATION METHOD OF A SUPPORTED METALLOCENE CATALYST

This application is a National Stage Application of International Application No. PCT/KR2014/011580, filed Nov. 28, 2014, and claims the benefit of Korean Patent Application No. 10-2014-0167732, filed Nov. 27, 2014 and Korean Patent Application No. 10-2013-0146473, filed Nov. 28, 2013, the contents of which are incorporated herein by reference in their entirety for all purposes as if fully set forth below.

TECHNICAL FIELD

The present invention relates to a preparation method of a highly active supported metallocene catalyst which can prepare a polyolefin of high bulk density.

BACKGROUND OF ART

The polymerization process of an olefin is generally classified into a high pressure process, a solution process, a slurry process, a gas-phase process, and so on, and there have been various efforts to prepare olefin polymers having desired properties by applying various metallocene catalysts to the polymerization process.

The metallocene catalyst for the preparation method of polyethylene using a slurry and gas-phase polymerization process must be firmly fixed to a suitable carrier in order to not generate fouling due to leaching in a reactor. Particularly, the bulk density of the polymer relates to productivity per reactor, and thus not only the activity of the catalyst but also the bulk density of the polymer must be high.

It is usual in the preparation of a supported metallocene catalyst not only to use a highly active metallocene catalyst for increasing the catalytic activity but also to increase the amount of aluminoxane, a cocatalyst, supported on a carrier. However, in the case of a highly active supported catalyst, generally, a hollow polymer is formed and the bulk density of the prepared polymer decreases because the polymerization occurs first at the surface of the carrier and the formed polymer is crystallized and hinders the monomers from diffusion. For resolving this problem, there has been an attempt for controlling the diffusion speed of the monomer such as ethylene into the carrier by carrying out pre-polymerization first at a low temperature and a low pressure, but there was a problem of installing an additional polymerization reactor. Further, there was a method of treating hydroxy groups of the surface of the carrier with aluminum chloride and so on for increasing the efficiency of loading, but it increases the catalyst preparation cost and may decrease the uniformity of the catalyst due to a side-reaction.

DETAILED DESCRIPTION OF THE INVENTION

Technical Problem

It is an aspect of the present invention to provide a preparation method of a supported metallocene catalyst which can prepare a polyolefin polymer with improved bulk density while maintaining its highly active catalytic characteristic, and a preparation method of a polyolefin using the same.

Technical Solution

The present invention provides a method of preparing a supported metallocene catalyst, including the steps of:

preparing a silica carrier;

loading an alkylaluminoxane on the inside and the surface of the silica carrier by bringing the silica carrier into contact with the alkylaluminoxane, a cocatalyst component; and sequentially loading one or more metallocene compounds on the silica carrier on which the alkylaluminoxane is loaded, wherein the alkylaluminoxane is dividedly loaded at different temperatures by a separate-input method.

The alkylaluminoxane may be loaded on the silica carrier by the separate-input method of primarily loading a part of the whole input of the alkylaluminoxane at a temperature of 50° C. or more and secondarily loading the rest of the whole input of the same at the temperature of 40° C. or less. Furthermore, the silica carrier on which the alkylaluminoxane is loaded may be obtained by the method of primarily loading 50 to 90 wt % of the whole input of the alkylaluminoxane on the silica carrier and carrying out the former reaction at 50 to 150° C., and secondarily loading the rest of the alkylaluminoxane on the silica carrier and carrying out the latter reaction at −10 to 40° C.

The supported metallocene catalyst obtained by the method of the present invention is composed of: an outer layer including the area from each surface to a ⅓ position of the particle diameter toward the center and an inner layer including the rest of the area from the ⅓ position of the particle diameter to the center, in the cross-section of the supported catalyst particle, and includes the silica carrier on which the inside and surface thereof the alkylaluminoxane is loaded; and one or more metallocene compounds loaded on the silica carrier. Here, the content ratio (wt %) of Al/Si elements of the inner layer may be 65% or more compared to the content ratio (wt %) of Al/Si elements of the outer layer. At this time, it is preferable that the content ratio (wt %) of Al/Si elements of the inner layer is 90 to 150% compared to the content ratio (wt %) of Al/Si elements of the outer layer.

The silica carrier may be one or more carriers selected from the group consisting of silica, silica-alumina, and silica-magnesia.

The alkylaluminoxane may be one or more compounds selected from the group consisting of methylaluminoxane, ethylaluminoxane, butylaluminoxane, and isobutylaluminoxane.

The present invention may further include the step of loading a borate compound as a second cocatalyst on the silica carrier on which the alkylaluminoxane and one or more metallocene compounds are loaded.

The borate compound may include a borate compound of a tri-substituted ammonium salt type of borate compound, a dialkyl ammonium salt type of borate compound, or a tri-substituted phosphonium salt type of borate compound.

Furthermore, the present invention provides a method of preparing a polyolefin including the step of carrying out a polymerization reaction of an olefinic monomer in the presence of the supported metallocene catalyst prepared according to the above method.

The polyolefin may have bulk density of 0.1 to 0.8 g/cm$^3$. Furthermore, the polyolefin may show the settling efficiency, defined by the following equation, of 20 to 80%.

Settling efficiency=amount of ethylene used/
(amount of ethylene used+solvent content)×
100%                                                    [Calculation Equation 1]

Advantageous Effects

The supported metallocene catalyst according to the present invention can prepare a polyolefin polymer that is superior in bulk density while maintaining its high activity, because the alkylaluminoxane cocatalyst more deeply penetrates into the pores of the silica carrier than the prior art, and a substantial amount of the same is loaded on the surface of the carrier.

DETAILED DESCRIPTION OF THE EMBODIMENT

Figure 1:
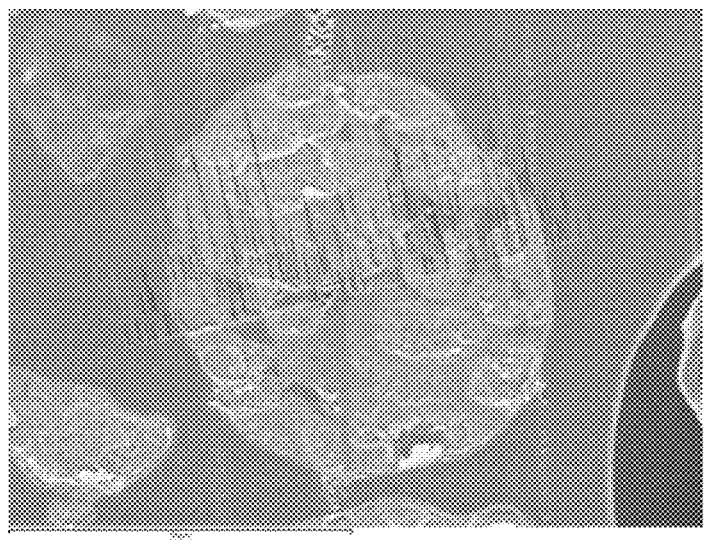
FIG. 1 represents the result of the shape analysis obtained through the depth profile of the inside of the supported catalyst of Comparative Example 1.
Figure 1:
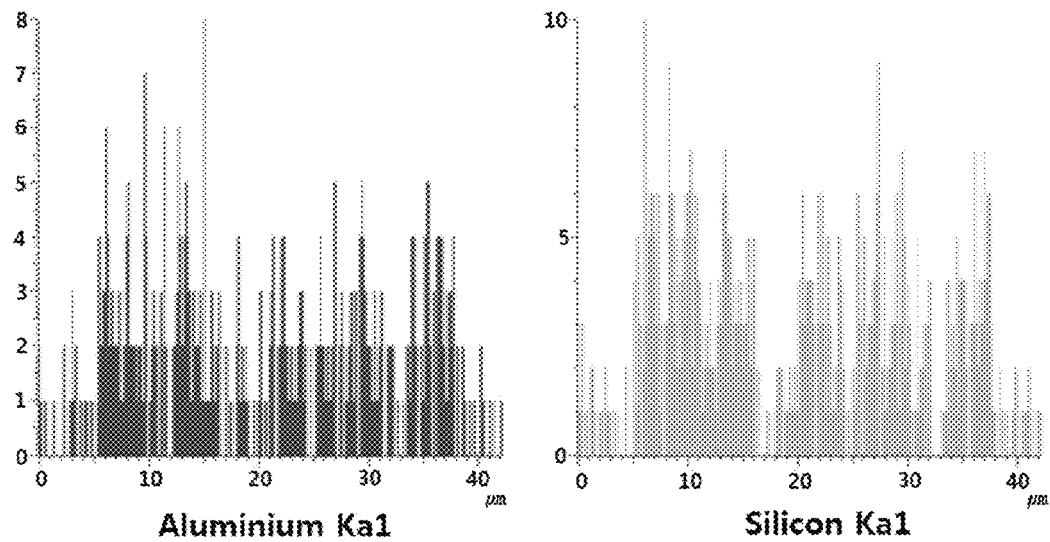

Hereinafter, the present invention is explained in more detail. The terms or words used in the present description and claims must not be limitedly interpreted as having usual or lexical meanings and must be interpreted with the meanings and concepts corresponding to the technical ideas of the present invention, in accordance with the principle that inventors can suitably define the concepts of the terms for explaining their own invention in the best possible way.

Further, the meaning of the term "include" used in the specification embodies specific characteristics, areas, essence, steps, actions, elements, and/or components, and does not exclude existence or addition of other specific characteristics, areas, essence, steps, actions, elements, components, and/or groups.

Hereinafter, the preparation method of the supported metallocene catalyst according to the embodiment of the invention is explained.

Firstly, the supported catalyst particle of the present invention includes the silica carrier on which the alkylaluminoxane, a cocatalyst, is supported. Furthermore, in the cross-section of the supported catalyst particle, the area from each surface to a ⅓ position of the particle diameter toward the center is defined as the outer layer, and the rest of the area from the ⅓ position of the particle diameter to the center, That is, the area including the rest of the inner ⅔ portion of the particle, is defined as the inner layer. Therefore, the inner layer includes the area from the center to the position inside 70% of the longest radius of the silica carrier, and the outer layer includes the rest of the outer area of the silica carrier. The inside of the silica carrier mentioned in this description includes pores, and unless there is a particular mention thereof in this description, the 'moisture content' of the carrier is defined as the percentage of the weight of moisture included in the carrier per the total weight of the carrier.

In addition, the supported metallocene catalyst of the present invention means the catalyst on which one or more metallocene catalysts are supported, and the supported metallocene catalyst of the present invention may further include a borate compound as a second cocatalyst.

The present invention relates to a preparation method of the supported metallocene catalyst which can prepare a polyolefin polymer with improved bulk density while maintaining its highly active catalytic characteristic.

According to one embodiment of the present invention, a method of preparing a supported metallocene catalyst includes the steps of: preparing a silica carrier; loading an alkylaluminoxane on the inside and the surface of the silica carrier by bringing the silica carrier into contact with the alkylaluminoxane, a cocatalyst component; and sequentially loading one or more metallocene compounds on the silica carrier on which the alkylaluminoxane is loaded, wherein the alkylaluminoxane is dividedly loaded at different temperatures by a separate-input method.

That is, the present invention is characterized in that the cocatalyst is dividedly loaded on the silica carrier so that a relatively large amount of the cocatalyst is distributed on the inside of the carrier, but the loading temperature is different in the preparation of the supported metallocene catalyst.

According to this method, the present invention can provide the supported metallocene catalyst having a specific parameter regarding the content of Al/Si in the carrier. Preferably, the present invention may provide the supported metallocene catalyst that is composed of: the outer layer including the area from each surface to a ⅓ position of the particle diameter toward the center and the inner layer including the rest of the area from the ⅓ position of the particle diameter to the center, in the cross-section of the supported catalyst particle, and includes the silica carrier on which the inside and surface thereof the alkylaluminoxane is loaded; and one or more metallocene compounds loaded on the silica carrier, wherein the content ratio (wt %) of Al/Si elements of the inner layer is 65% or more compared to the content ratio (wt %) of Al/Si elements of the outer layer.

The metallocene catalyst according to the present invention is characterized in that a larger amount of the alkylaluminoxane than in the prior art is penetrated into and chemically bonded with the inside and the pores of the silica carrier, and a substantial amount of the same is physically bonded to the surface of the carrier. That is, there was a small amount of alkylaluminoxane that was penetrated into and chemically bonded to the inside of the carrier in the past. However, the present invention loads more cocatalyst on the inside of the inner layer than the prior art by dividedly loading the alkylaluminoxane on the carrier. Therefore, the supported metallocene catalyst of the present invention composed of the inner layer and the outer layer includes a large amount of the alkylaluminoxane in the inner layer, and thus it can improve the bulk density in comparison to the prior art and the catalytic activity can be easily controlled.

In the supported metallocene catalyst according to the present invention having such characteristics, the content ratio (wt %) of Al/Si elements of the inner layer is 65% or more, or preferably 90 to 150%, compared to the content ratio (wt %) of Al/Si elements of the outer layer. This means that a large amount of the alkylaluminoxane is deeply penetrated into the inner layer of the silica carrier.

The metallocene compound may be one or more metallocene compounds that are well known in the related art, as disclosed below.

The method of preparing the supported metallocene catalyst of the present invention includes the steps of: preparing a silica carrier; loading an alkylaluminoxane on the inside and the surface of the silica carrier by bringing the silica carrier into contact with the alkylaluminoxane, a cocatalyst component; and sequentially loading one or more metallocene compounds on the silica carrier on which the alkylaluminoxane is loaded.

Hereinafter, the steps that may be included in the method of the present invention are explained in more detail.

Firstly, the present invention carries out the step of preparing the silica carrier. The silica carrier having morphology suitable for a Phillips loop slurry process is selected in the present invention. The present invention optimizes the combination of the metallocene catalyst and the alkylaluminoxane, the cocatalyst, loaded on the carrier by selectively controlling the amount of silanol groups and siloxane groups of the silica carrier through the calcination conditions.

In order for the cocatalyst (for example, an MAO) to penetrate into the silica owing to the decrease in viscosity at a high temperature, to chemically react with —OH groups of the silica, and to be physically adsorbed onto the surface of the silica, the calcination may be carried out in a temperature range from the temperature where moisture disappears from the surface of the silica to a temperature where —OH groups completely disappear from the surface of the silica. According to a preferable embodiment, the calcination of the silica carrier may be carried out at a temperature of 100 to 700° C., and the moisture content of the silica carrier after the calcination is preferably 0.1 to 7 wt %.

The surface of the carrier may include 0.5 to 5 mmol/g of a hydroxy group, or preferably 0.7 to 2 mmol/g of a hydroxy group, as the carrier shows the moisture content of the range disclosed above.

The carrier may be one or more carriers selected from the group consisting of silica, silica-alumina, and silica-magnesia, and preferably it may be silica. In addition to this, any carrier satisfying said moisture content range may be used without limitation.

The carrier may show more improved activity by treating the surface of the carrier with a small quantity of trialkylaluminum as necessary.

The trialkylaluminum may be one or more compounds selected from the group consisting of trimethylaluminum (TMAl), triethylaluminum (TEN), and tributylaluminum (TBAl), and preferably it may be triethylaluminum (TEN). Furthermore, a solvent may be used for inducing a smooth contact reaction between the carrier and the trialkylaluminum in the step of treating the surface of the carrier, but the reaction may also be carried out without the solvent. Most organic solvents such as an aliphatic hydrocarbon like hexane, pentane, and heptane; an aromatic hydrocarbon like toluene and benzene; a chlorinated hydrocarbon like dichloromethane; an ether like diethylether and tetrahydrofuran; acetone; ethylacetate; and so on may be used as the solvent. Preferably, hexane, heptane, toluene, or dichloromethane may be used as the solvent. Further, the step of treating the surface of the carrier may be carried out at a temperature of 0 to 120° C., preferably 10 to 100° C., and more preferably 30 to 90° C., in the aspect of improving the process efficiency.

The amount of the trialkylaluminum reacted with the surface of the carrier in the above step is not particularly limited, but the step may be carried out to make the mole ratio of the alkylaluminoxane to the trialkylaluminum 1:10 to 1:20, preferably 1:12 to 1:18, in the relationship with the alkylaluminoxane disclosed below. That is, the mole ratio of the alkylaluminoxane to the trialkylaluminum is preferably 1:10 or more for the proper reaction with the moisture in the surface of the carrier, and the mole ratio is preferably 1:20 or less in order to not eliminate the silanol groups in the surface of the carrier that react with the alkylaluminoxane.

According to one embodiment of the present invention, the additional step of treating the surface of the carrier may be carried out by the method of mixing the carrier and the solvent in a reactor, adding the trialkylaluminum thereto, and carrying out the reaction thereof at the temperature range disclosed above for 30 min to 3 h while stirring. However, the present invention is not limited to this.

As the succeeding process, the preparation method of the supported metallocene catalyst of the present invention includes the step of loading the alkylaluminoxane on the inside and the surface of the silica carrier by bringing the silica carrier into contact with the alkylaluminoxane, a cocatalyst component.

Particularly, the present invention is characterized in loading the alkylaluminoxane dividedly on the silica carrier at different temperatures while varying the temperature from high to low.

That is, the alkylaluminoxane may be loaded on the silica carrier by the separate-input method of primarily loading a part of the whole input of the alkylaluminoxane at the higher temperature and secondarily loading the rest of the whole input of the same at the lower temperature. The higher temperature may include the range of 50° C. or more, preferably 50 to 150° C., and the lower temperature may include the range of 40° C. or less, or −10 to 40° C.

Therefore, according to a preferable embodiment of the present invention, the preparation method of the supported metallocene catalyst wherein the alkylaluminoxane is loaded on the silica carrier by the separate-input method of primarily putting a part of the whole input of the alkylaluminoxane at the temperature of 50° C. or more and secondarily putting the rest of the whole input of the same at the temperature of 40° C. or less is provided.

Furthermore, according to the most preferable embodiment of the present invention, the silica carrier on which the alkylaluminoxane is loaded may be obtained by the method of primarily loading 50 to 90 wt % of the whole input of the alkylaluminoxane on the silica carrier and carrying out the former reaction at 50 to 150° C., and secondarily loading the rest of the alkylaluminoxane on the silica carrier and carrying out the latter reaction at −10 to 40° C.

More specifically, the present invention brings the silica obtained in above step into contact with the alkylaluminoxane, the cocatalyst. The present invention makes more alkylaluminoxane penetrate into the silica carrier than the prior art, and makes a substantial amount of the alkylaluminoxane loaded on the surface of the same, as disclosed above. According to this method, the silica carrier that is composed of the inner layer and the outer layer surrounding the same and includes the alkylaluminoxane loaded on its inside and surface is provided.

The present invention is characterized in that the alkylaluminoxane and the silica carrier come in contact with each other in the higher temperature condition where the chemical attachment is predominant and the reactant decreases in viscosity and is easily diffused into the pores inside the silica in advance, and the alkylaluminoxane comes in contact with the silica at the lower temperature so that the cocatalyst component is physically adsorbed and loaded onto the surface of the silica. Therefore, in the present invention, the bulk density of the polymer and the catalytic activity may be controlled not only by the amount of the alkylaluminoxane and the contact temperature but also by the method of loading the same thereon.

In the process of loading the alkylaluminoxane, as disclosed above, a method of dividedly loading the alkylaluminoxane at the higher temperature and the lower temperature twice or more is used. For example, the alkylaluminoxane may be dividedly loaded twice. In the first loading process, the former reaction may be carried out in the temperature range of 50 to 150° C., and in the second loading process, the latter reaction may be carried out in the temperature range of −10 to 40° C. while dividedly putting the rest of the alkylaluminoxane therein for loading the same. Furthermore, 50 to 90 wt % of the whole input of the alkylaluminoxane is loaded in the first loading process, and the rest is loaded in the second loading process.

At this time, if the alkylaluminoxane, the cocatalyst, is not dividedly loaded but is loaded all at once, the alkylaluminoxane is unevenly loaded on the carrier and aluminum excessively exists on the surface of the carrier. In contrast, the metallocene compound of a small molecular size is evenly loaded on the inside and the surface of the carrier. Therefore, if the alkylaluminoxane is loaded all at once, the total catalytic activity decreases because the metallocene compound loaded on the inside of the carrier is not activated, and accordingly, there is a problem of the decrease in the bulk density of the prepared polymer because the polymerization is carried out by the catalyst activated only at the surface.

Meanwhile, the alkylaluminoxane is a cocatalyst for assisting the activity of the metallocene catalyst disclosed below.

Said step may be carried out by mixing and reacting the carrier and the alkylaluminoxane in the presence or absence of the solvent while stirring.

Here, the alkylaluminoxane may be one or more compounds selected from the group consisting of methylaluminoxane, ethylaluminoxane, butylaluminoxane, and isobutylaluminoxane.

The amount of the alkylaluminoxane loaded on the silica carrier in above step may be 5 to 15 mmol/g based on 1 g of the silica carrier. That is, the former reaction and the latter reaction of the alkylaluminoxane may be carried out while dividedly loading the alkylaluminoxane at the higher temperature and the lower temperature, within the above loading amount of the alkylaluminoxane.

A solvent may be used in the above step for inducing a smooth contact reaction between the carrier and the alkylaluminoxane, but the reaction may also be carried out without the solvent.

Most organic solvents such as an aliphatic hydrocarbon like hexane, pentane, and heptane; an aromatic hydrocarbon like toluene and benzene; a chlorinated hydrocarbon like dichloromethane; an ether like diethylether and tetrahydrofuran; acetone; ethylacetate; and so on may be used as the solvent. Preferably, hexane, heptane, toluene, or dichloromethane may be used as the solvent.

By the above process, the present invention can provide the silica carrier of which the inside is penetrated by more cocatalyst (the alkylaluminoxane) than the prior art, and the outside is attached with a substantial amount of the cocatalyst (the alkylaluminoxane).

The preparation method of the supported metallocene catalyst according to the present invention includes the step of sequentially loading one or more metallocene compounds on the silica carrier on which the alkylaluminoxane is loaded.

The present invention sequentially loads one or more metallocene compounds on the silica carrier on which the alkylaluminoxane is loaded by the above method, and optimizes the interaction with the cocatalyst already loaded on the carrier according to the reaction condition of each metallocene compound for controlling the catalytic characteristics. It can be recognized by looking into the depth profile of the catalyst carrier with a SEM/EDS analysis method that the amount of the alkylaluminoxane loaded on the inside and the surface of the silica carrier in the supported metallocene catalyst prepared by above method is controlled.

Furthermore, the productivity of polyolefin can be largely improved in the ethylene polymerization according to the present invention, because the bulk density and the catalytic activity are increased.

The metallocene compound is the main component which can exhibit the activity as the catalyst in company with the alkylaluminoxane disclosed above.

The above step may be carried out by the method of reacting the carrier and the metallocene compound while mixing and stirring the same in the presence of a solvent.

At this time, the amount of the metallocene compound loaded on the silica carrier in the above step may be 0.01 to 1 mmol/g based on 1 g of the silica carrier. That is, it is preferable that the amount is in said range in consideration of the contribution effect of the metallocene compound on the catalytic activity.

Furthermore, the temperature condition is not particularly limited in the step of loading the metallocene compound.

One or more metallocene compounds may be used without limitation if they are conventionally used in the technical field to which the present invention pertains. For example, the metallocene compound may be 1) a metallocene compound including the combination of a non-bridge Cp and a Cp type, 2) a metallocene compound including a combination of a Si bridge Cp and a Cp type, 3) a metallocene compound including a combination of a C bridge Cp and a Cp type, 4) a metallocene compound including a combination of a Si bridge Cp and an amine type, 5) a metallocene compound including a combination of an ethylene bridge Cp and a Cp type, 6) a metallocene compound including a combination of a phenylene bridge Cp and an amine type, and 7) a metallocene compound including a C—C bridge, a Si—C bridge, or a Si—Si bridge. The Cp may be cyclopentadienyl, indenyl, fluorenyl, indenoindole (InIn), and so on, and the structure is not limited. Furthermore, said Si-based bridge may include a t-butoxy-hexyl substituent or a similar structure thereof, and the indene structure may include a tetrahydro-indene structure. Furthermore, the metallocene compound of the present invention includes a low molecular weight metallocene compound (a Cp type) and a high molecular weight metallocene compound (for example, a CGC type or an ansa type).

As a preferable example of the metallocene compound, there may be one or more compounds selected from the group consisting of the compounds represented the following Chemical Formulae 1 to 6.

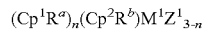         [Chemical Formula 1]

$(Cp^1R^a)_n(Cp^2R^b)M^1Z^1_{3-n}$

In Chemical Formula 1, $M^1$ is a group 4 transition metal;

$Cp^1$ and $Cp^2$ are the same as or different from each other, and are independently any one selected from the group consisting of cyclopentadienyl, indenyl, 4,5,6,7-tetrahydro-1-indenyl, and a fluorenyl radical, and they may be substituted with a C1-C20 hydrocarbon;

$R^a$ and $R^b$ are the same as or different from each other, and are independently hydrogen, a C1-C20 alkyl, a C1-C10 alkoxy, a C2-C20 alkoxyalkyl, a C6-C20 aryl, a C6-C10 aryloxy, a C2-C20 alkenyl, a C7-C40 alkylaryl, a C7-C40 arylalkyl, a C8-C40 arylalkenyl, or a C2-C10 alkynyl;

$Z^1$ is a halogen, a C1-C20 alkyl, a C2-C10 alkenyl, a C7-C40 alkylaryl, a C7-C40 arylalkyl, a C6-C20 aryl, a substituted or non-substituted C1-C20 alkylidene, a substituted or non-substituted amino group, a C2-C20 alkylalkoxy, or a C7-C40 arylalkoxy; and n is 1 or 0.

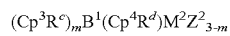         [Chemical Formula 2]

$(Cp^3R^c)_mB^1(Cp^4R^d)M^2Z^2_{3-m}$

In Chemical Formula 2,

M² is a group 4 transition metal;

Cp³ and Cp⁴ are the same as or different from each other, and are independently any one selected from the group consisting of cyclopentadienyl, indenyl, 4,5,6,7-tetrahydro-1-indenyl, and a fluorenyl radical, and they may be substituted with a C1-C20 hydrocarbon;

$R^c$ and $R^d$ are the same as or different from each other, and are independently hydrogen, a C1-C20 alkyl, a C1-C10 alkoxy, a C2-C20 alkoxyalkyl, a C6-C20 aryl, a C6-C10 aryloxy, a C2-C20 alkenyl, a C7-C40 alkylaryl, a C7-C40 arylalkyl, a C8-C40 arylalkenyl, or a C2-C10 alkynyl;

$Z^2$ is a halogen, a C1-C20 alkyl, a C2-C10 alkenyl, a C7-C40 alkylaryl, a C7-C40 arylalkyl, a C6-C20 aryl, a substituted or non-substituted C1-C20 alkylidene, a substituted or non-substituted amino group, a C2-C20 alkylalkoxy, or a C7-C40 arylalkoxy;

$B^1$ is one or more radicals including a carbon, germanium, silicon, phosphorus, or nitrogen atom, or a combination thereof, which crosslink the $Cp^3R^c$ ring and the $Cp^4R^d$ ring or crosslink one $Cp^4R^d$ ring with M²; and m is 1 or 0.

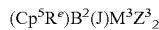  [Chemical Formula 3]

In Chemical Formula 3,

M³ is a group 4 transition metal;

Cp⁵ is any one selected from the group consisting of cyclopentadienyl, indenyl, 4,5,6,7-tetrahydro-1-indenyl, and a fluorenyl radical, and it may be substituted with a C1-C20 hydrocarbon;

$R^e$ is hydrogen, a C1-C20 alkyl, a C1-C10 alkoxy, a C2-C20 alkoxyalkyl, a C6-C20 aryl, a C6-C10 aryloxy, a C2-C20 alkenyl, a C7-C40 alkylaryl, a C7-C40 arylalkyl, a C8-C40 arylalkenyl, or a C2-C10 alkynyl;

$Z^3$ is a halogen, a C1-C20 alkyl, a C2-C10 alkenyl, a C7-C40 alkylaryl, a C7-C40 arylalkyl, a C6-C20 aryl, a substituted or non-substituted C1-C20 alkylidene, a substituted or non-substituted amino group, a C2-C20 alkylalkoxy, or a C7-C40 arylalkoxy;

$B^2$ is one or more radicals including a carbon, germanium, silicon, phosphorus, or nitrogen atom, or a combination thereof, which crosslink the $Cp^5R^e$ ring with J; and J is any one selected from the group consisting of $NR^f$, O, $PR^f$, and S, where $R^f$ is a C1-C20 alkyl, aryl, substituted alkyl, or substituted aryl.

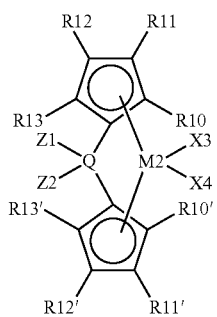  [Chemical Formula 4]

In Chemical Formula 4,

R10 to R13 and R10' to R13' are the same as or different from each other, and are independently hydrogen, a C1-C20 alkyl group, a C2-C20 alkenyl group, a C6-C20 aryl group, a C7-C20 alkylaryl group, a C7-C20 arylalkyl group, or a C1-C20 amine group, and 2 or more adjacent groups among R10 to R13 and R10' to R13' may be connected to each other and form one or more aliphatic rings, aromatic rings, or hetero rings;

Z1 and Z2 are the same as or different from each other, and are independently hydrogen, a C1-C20 alkyl group, a C3-C20 cycloalkyl group, a C1-C20 alkoxy group, a C6-C20 aryl group, a C6-C10 aryloxy group, a C2-C20 alkenyl group, a C7-C40 alkylaryl group, or a C7-C40 arylalkyl group;

Q is a C1-C20 alkylene group, a C3-C20 cycloalkylene group, a C6-C20 arylene group, a C7-C40 alkylarylene group, or a C7-C40 arylalkylene group;

M2 is a group 4 transition metal; and

X3 and X4 are the same as or different from each other, and are independently a halogen, a C1-C20 alkyl group, a C2-C10 alkenyl group, a C6-C20 aryl group, a nitro group, an amido group, a C1-C20 alkylsilyl group, a C1-C20 alkoxy group, or a C1-C20 sulfonate group.

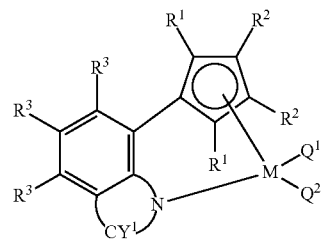  [Chemical Formula 5]

In Chemical Formula 5, $R^1$ and $R^2$ are the same as or different from each other, and are independently hydrogen, a C1-C20 alkyl, a C2-C20 alkenyl, a C6-C20 aryl, a C6-C20 silyl, a C7-C20 alkylaryl, a C7-C20 arylalkyl, or a metalloid of a group 4 metal substituted with a hydrocarbyl, and $R^1$ and $R^2$, or two $R^2$s, may be connected to each other and form a ring by an alkylidine including a C1-C20 alkyl or a C6-C20 aryl;

each $R^3$ is independently hydrogen, a halogen, a C1-C20 alkyl, a C2-C20 alkenyl, a C6-C20 aryl, a C7-C20 alkylaryl, a C7-C20 arylalkyl, a C1-C20 alkoxy, a C6-C20 aryloxy, or an amido, and 2 or more groups among $R^3$s may be connected to each other and form an aliphatic ring or an aromatic ring;

$CY^1$ is a substituted or non-substituted aliphatic or aromatic ring, and the substituent in $CY^1$ is a halogen, a C1-C20 alkyl, a C2-C20 alkenyl, a C6-C20 aryl, a C7-C20 alkylaryl, a C7-C20 arylalkyl, a C1-C20 alkoxy, a C6-C20 aryloxy, or an amido, and 2 or more groups of the substituents may be connected to each other and form an aliphatic ring or an aromatic ring when there is a plurality of substituents;

M is a group 4 transition metal; and $Q^1$ and $Q^2$ are independently a halogen, a C1-C20 alkyl, a C2-C20 alkenyl, a C6-C20 aryl, a C7-C20 alkylaryl, a C7-C20 arylalkyl, a C1-C20 alkylamido, a C6-C20 arylamido, or a C1-C20 alkylidene.

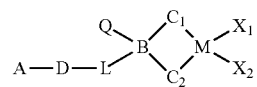  [Chemical Formula 6]

In Chemical Formula 6,

A is hydrogen, a halogen, a C1-C20 alkyl group, a C2-C20 alkenyl group, a C6-C20 aryl group, a C7-C20 alkylaryl group, a C7-C20 arylalkyl group, a C1-C20 alkoxy group, a C2-C20 alkoxyalkyl group, a C3-C20 heterocycloalkyl group, or a C5-C20 heteroaryl group;

D is —O—, —S—, —N(R)—, or —Si(R)(R')—, wherein R and R' are the same as or different from each other, and are independently hydrogen, a halogen, a C1-C20 alkyl group, a C2-C20 alkenyl group, or a C6-C20 aryl group;

L is a C1-C10 linear or branched alkylene group;

B is carbon, silicon, or germanium;

Q is hydrogen, a halogen, a C1-C20 alkyl group, a C2-C20 alkenyl group, a C6-C20 aryl group, a C7-C20 alkylaryl group, or a C7-C20 arylalkyl group;

M is a group 4 transition metal;

$X_1$ and $X_2$ are the same as or different from each other, and are each independently a halogen, a C1-C20 alkyl group, a C2-C10 alkenyl group, a C6-C20 aryl group, a nitro group, an amido group, a C1-C20 alkylsilyl group, a C1-C20 alkoxy group, or a C1-C20 sulfonate group; and $C_1$ and $C_2$ are the same as or different from each other, and are independently represented by any one of the following Chemical Formula 7a, Chemical Formula 7b, or Chemical Formula 7c, with the proviso, except that both of C1 and C2 are Chemical Formula 7c.

[Chemical Formula 7a]

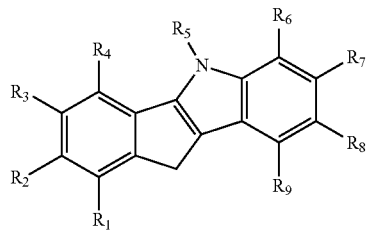

[Chemical Formula 7b]

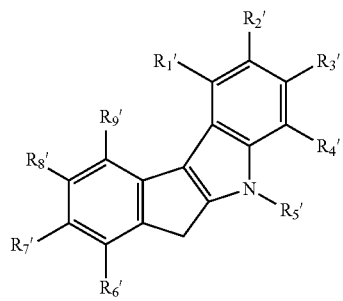

[Chemical Formula 7c]

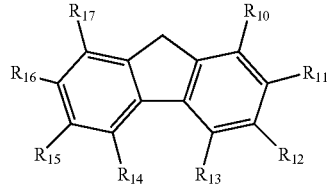

In Chemical Formulae 7a, 7b, and 7c, R1 to R17 and R1' to R9' are the same as or different from each other, and are independently hydrogen, a halogen, a C1-C20 alkyl group, a C2-C20 alkenyl group, a C1-C20 alkylsilyl group, a C1-C20 silylalkyl group, a C1-C20 alkoxysilyl group, a C1-C20 alkoxy group, a C6-C20 aryl group, a C7-C20 alkylaryl group, or a C7-C20 arylalkyl group, and 2 or more adjacent groups among R10 to R17 may be connected to each other and form a substituted or non-substituted aliphatic or aromatic ring.

The metallocene compound including the combination of the non-bridge Cp and the Cp type may include the compound represented by Chemical Formula 1.

The metallocene compound including the combination of the Si bridge Cp and the Cp type and the metallocene compound including the combination of the C bridge Cp and the Cp type may include the compound represented by Chemical Formula 2.

The metallocene compound including the combination of the Si bridge Cp and the amine type may include the compound represented by Chemical Formula 3.

The metallocene compound including the combination of the ethylene bridge Cp and the Cp type may include the compound represented by Chemical Formula 4.

The hydrocarbyl defined in Chemical Formula 5 is a monovalent functional group of a hydrocarbon from which a hydrogen atom is eliminated, and includes ethyl, phenyl, and so on. Further, the metalloid is an element with properties between those of metals and nonmetals, and includes arsenic, boron, silicon, tellurium, and so on.

According to one example of the present invention, the compound represented by Chemical Formula 1 may be a compound represented by any one of the following structural formulae, but the present invention is not limited to or by them.

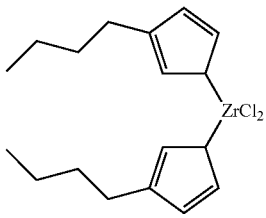

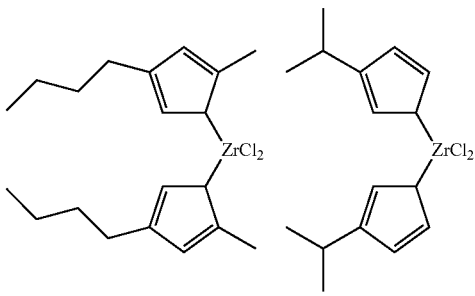

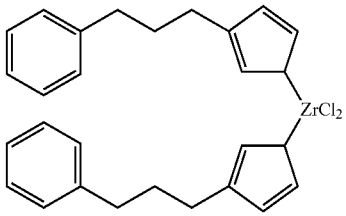

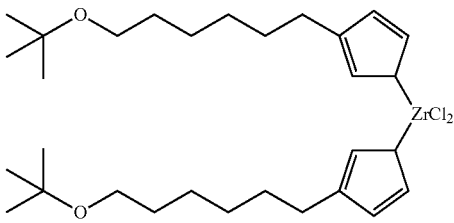

-continued
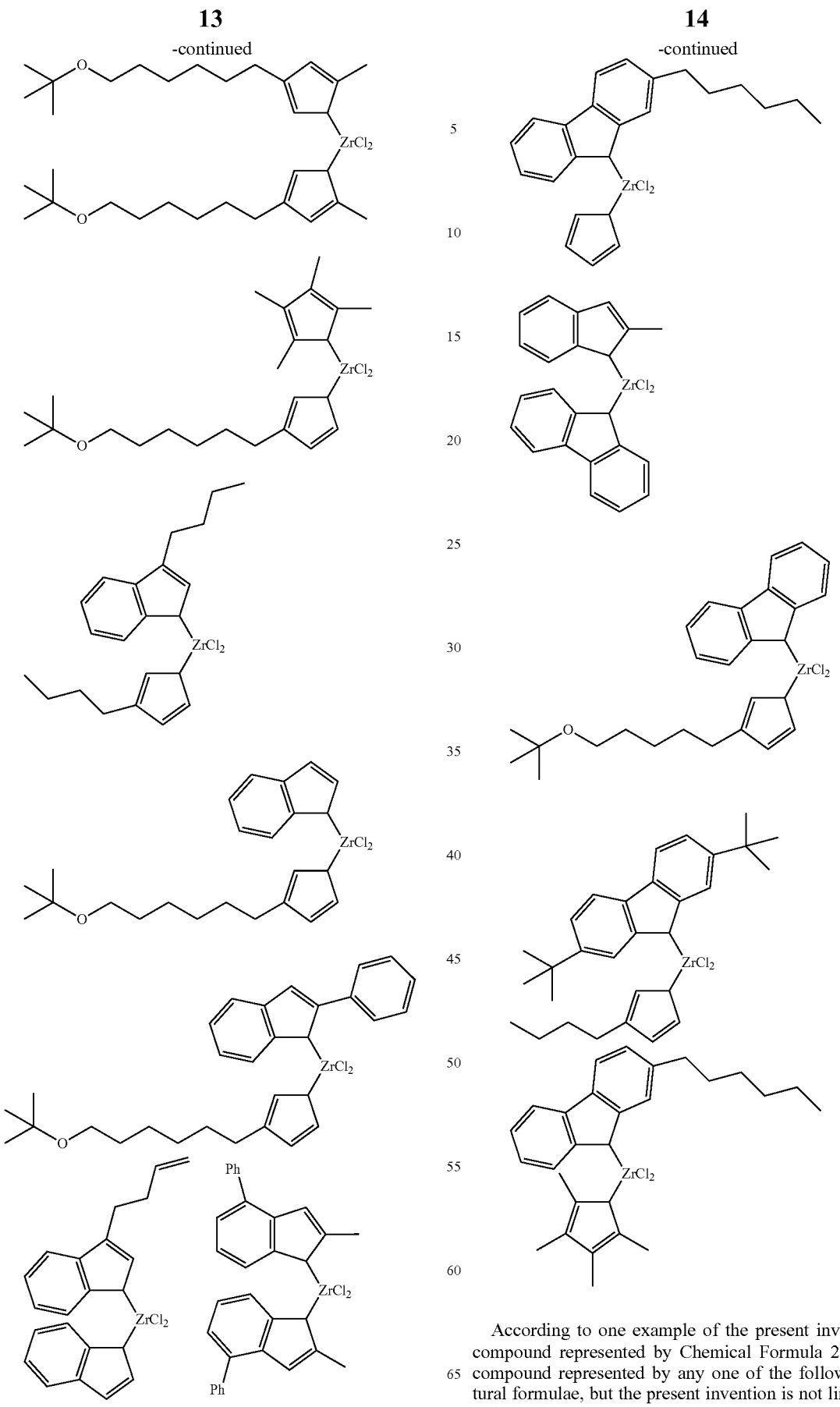
According to one example of the present invention, the compound represented by Chemical Formula 2 may be a compound represented by any one of the following structural formulae, but the present invention is not limited to or by them.

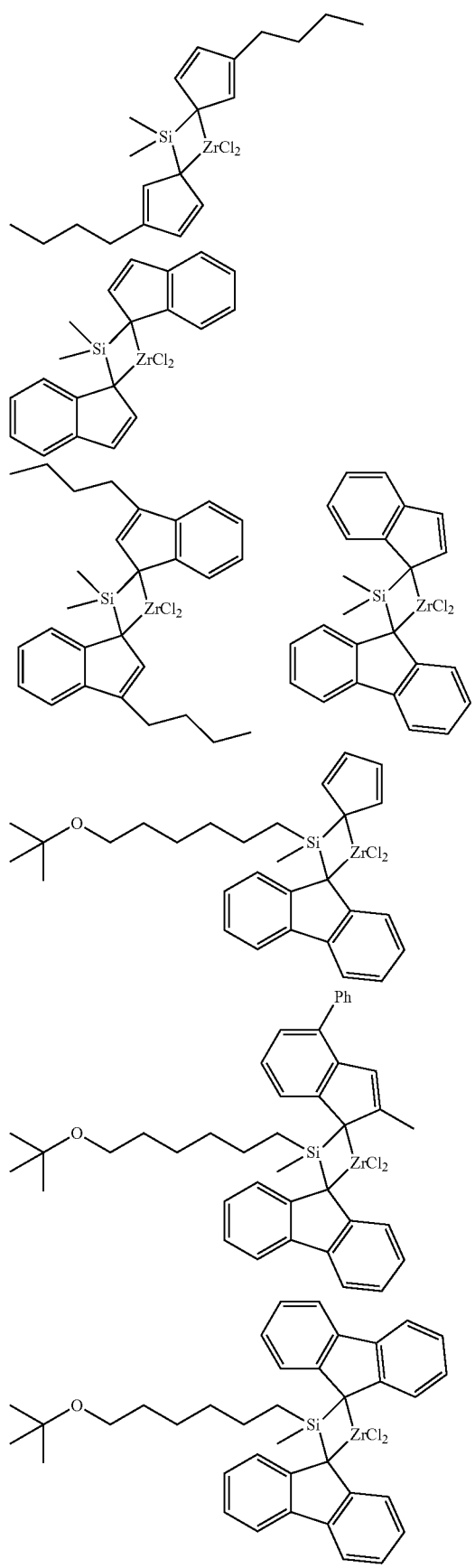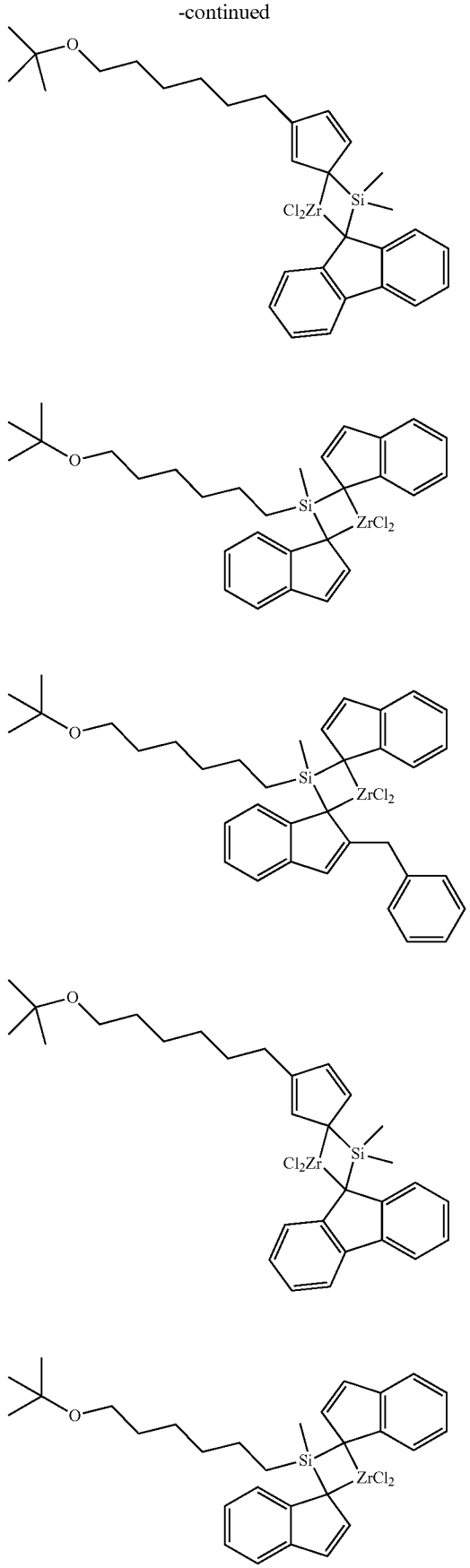

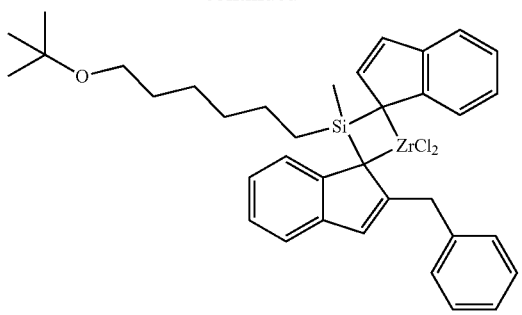
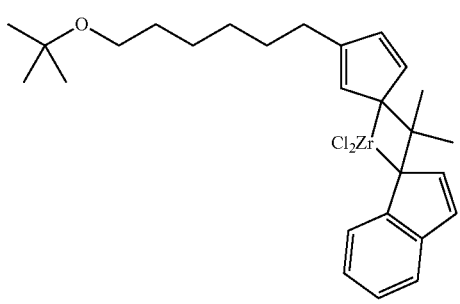
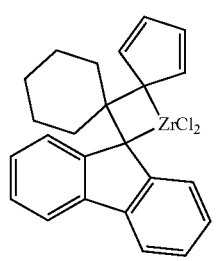
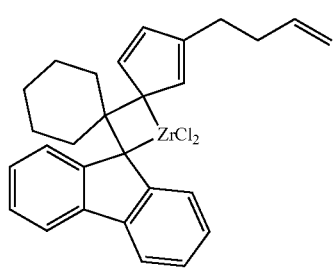
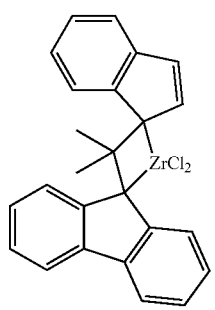
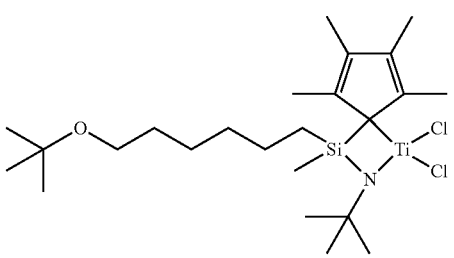
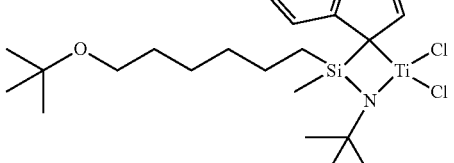
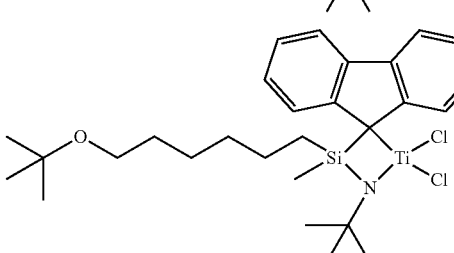
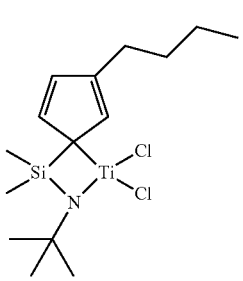
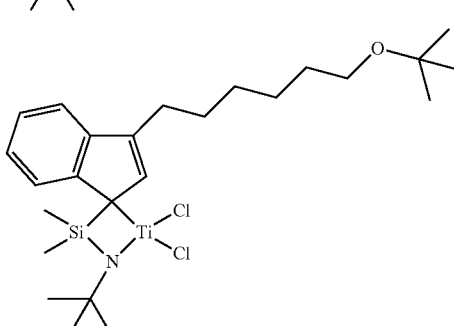
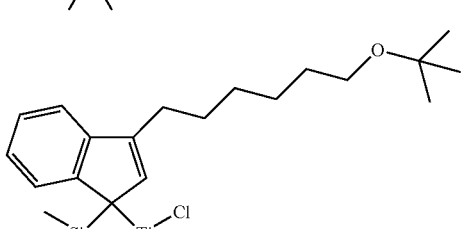
According to one example of the present invention, the compound represented by Chemical Formula 3 may be a compound represented by any one of the following structural formulae, but the present invention is not limited to or by them.

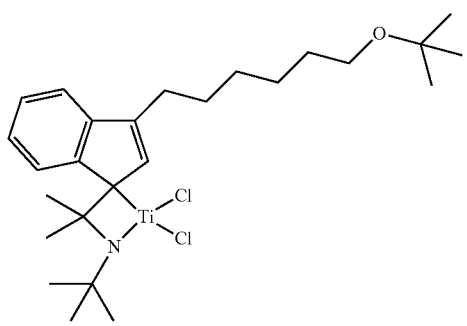

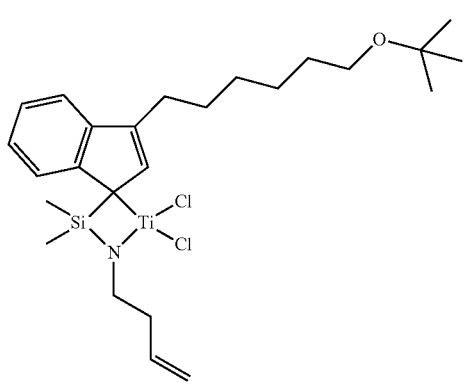

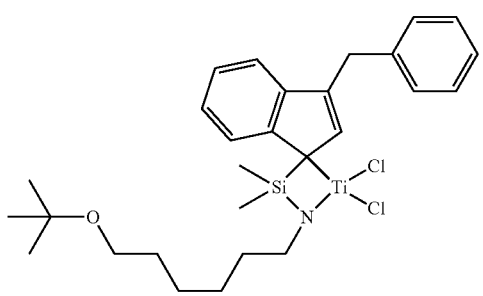

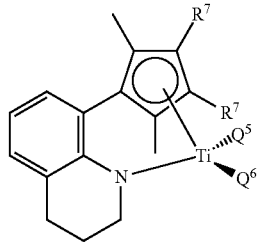

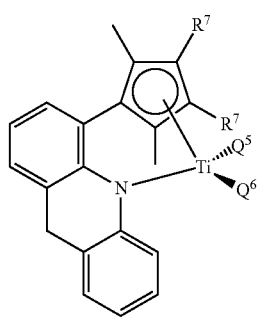

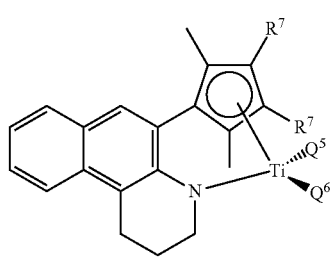

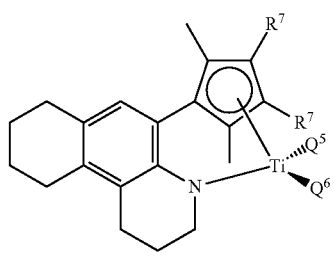

In the hybrid supported metallocene catalyst according to the present invention, Q in Chemical Formula 4 may be a C1-C20 alkylene group, Z1 and Z2 may independently be hydrogen, a C1-C20 alkyl group, or a C1-C20 alkoxy group, and X3 and X4 may be a halogen, but it is not limited to or by this.

Furthermore, the compound represented by Chemical Formula 5 may be a compound represented by any one of the following structural formulae, but the present invention is not limited to or by them.

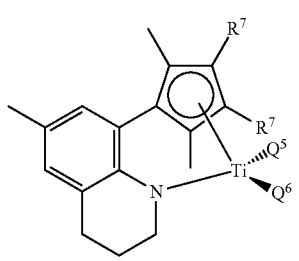

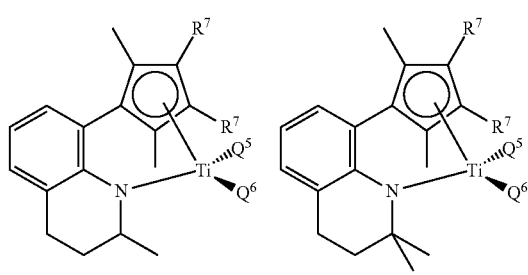

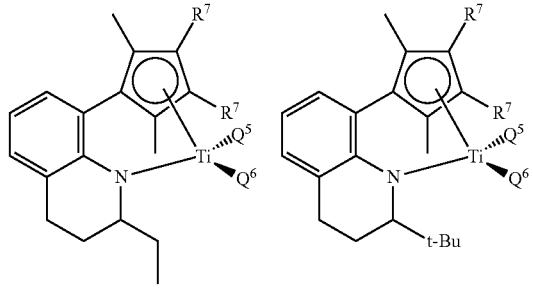

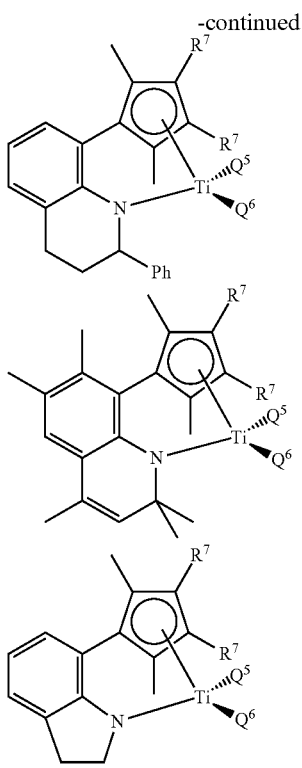

In above structural formulae,

R⁷ may independently be hydrogen or a methyl, and $Q^5$ and $Q^6$ may independently be methyl, dimethylamido, or chloride.

The metallocene compound represented by Chemical Formula 5 can structurally keep the angle of Cp-M-N narrow and the angle of $Q^1$-M-$Q^2$ wide where monomers approach, because the metal site is connected by the cyclopentadienyl ligand to which the amido group connected to the phenylene bridge in the form of a ring is introduced.

Furthermore, the ansa type of compound in the polymer metallocene compound may be the supported metallocene catalyst in which one or more metallocene compounds represented by Chemical Formula 6 are supported on the carrier.

The metallocene compound of Chemical Formula 6 is supported on the surface of the carrier having a Lewis acid characteristic, and can show higher polymerization activity because it includes a structure in which an indeno indole derivative and/or a fluorene derivative are crosslinked by a bridge and it has lone-pair electrons which can act as a Lewis base in the ligand structure. Furthermore, it can have high activity because of including the electron-rich indeno indole group and/or fluorene group, and it can be low in hydrogen reactivity and maintain its high activity because of a proper steric hindrance and the electronic effect of the ligand. Furthermore, because a nitrogen atom of the indeno indole derivative stabilizes beta-hydrogen of the growing polymer chain by a hydrogen bond and restrains the beta-hydrogen elimination, it becomes possible to prepare the polyolefin having a higher molecular weight.

The substituents in the metallocene compound of Chemical Formula 6 are explained in more detail as follows.

The C1-C20 alkyl group includes a linear or branched alkyl group, and specifically may be a methyl group, an ethyl group, a propyl group, an isopropyl group, an n-butyl group, a tert-butyl group, a pentyl group, a hexyl group, a heptyl group, an octyl group, and so on, but it is not limited to or by them.

The C2-C20 alkenyl group includes a linear or branched alkenyl group, and specifically may be an allyl group, an ethenyl group, a propenyl group, a butenyl group, a pentenyl group, and so on, but it is not limited to or by them.

The C6-C20 aryl group includes a monocyclic or condensed aryl group, and specifically may be a phenyl group, a biphenyl group, a naphthyl group, a phenanthrenyl group, a fluorenyl group, and so on, but it is not limited to or by them.

The C5-C20 heteroaryl group includes a monocyclic or condensed heteroaryl group, and specifically may be a carbazolyl group, a pyridyl group, a quinoline group, an isoquinoline group, a thiophenyl group, a furanyl group, an imidazole group, an oxazolyl group, a thiazolyl group, a triazine group, a tetrahydropyranyl group, a tetrahydrofuranyl group, and so on, but it is not limited to or by them.

The C1-C20 alkoxy group may be a methoxy group, an ethoxy group, a phenyloxy group, a cyclohexyloxy group, and so on, but it is not limited to or by them.

The group 4 transition metal may be titanium, zirconium, hafnium, and so on, but it is not limited to or by them.

Further, in Chemical Formulae 7a, 7b, and 7c which are the ligand-derived structure included in Chemical Formula 6, R1 to R17 and R1' to R9' may independently be hydrogen, a methyl group, an ethyl group, a propyl group, an isopropyl group, an n-butyl group, a tert-butyl group, a pentyl group, a hexyl group, a heptyl group, an octyl group, a phenyl group, a halogen group, a trimethylsilyl group, a triethylsilyl group, a tripropylsilyl group, a tributylsilyl group, a triisopropylsilyl group, a trimethylsilylmethyl group, a methoxy group, or an ethoxy group, but it is not limited to or by them.

L in Chemical Formula 6 is preferably a C4-C8 linear or branched alkylene group, but it is not limited to or by them, and the alkylene group may be substituted with a C1-C20 alkyl group, a C2-C20 alkenyl group, or a C6-C20 aryl group, or not.

A in Chemical Formula 6 is preferably hydrogen, a methyl group, an ethyl group, a propyl group, an isopropyl group, an n-butyl group, a tert-butyl group, a methoxymethyl group, a tert-butoxymethyl group, a 1-ethoxyethyl group, a 1-methyl-1-methoxyethyl group, a tetrahydropyranyl group, or a tetrahydrofuranyl group, but it is not limited to or by them.

B in Chemical Formula 6 is preferably silicon, but it is not limited to or by them.

According to one embodiment of the present invention, the structure represented by Chemical Formula 7a may be a structure represented by any one of the following structural formulae, but it is not limited to or by them.

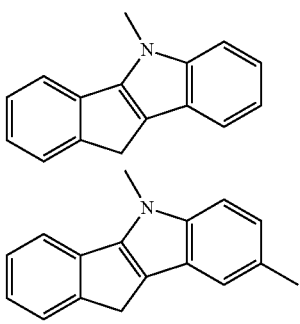

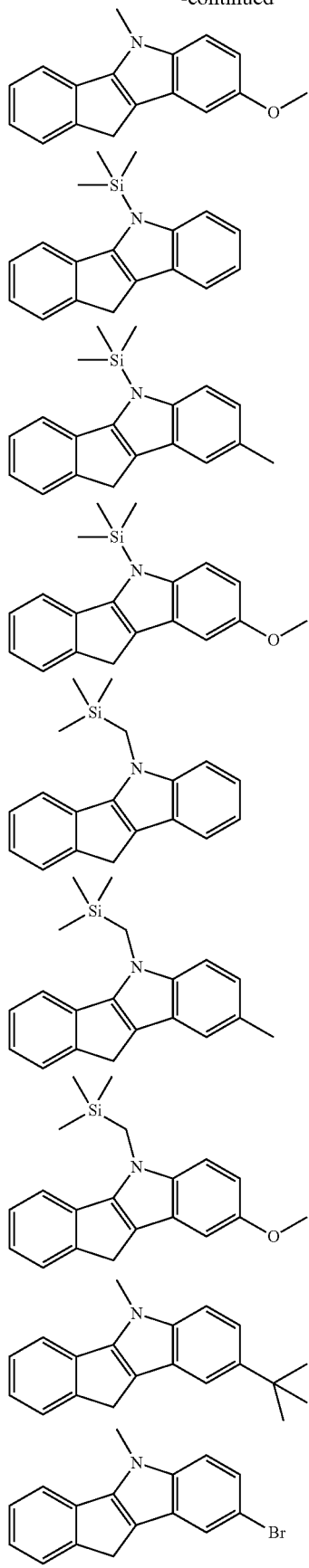
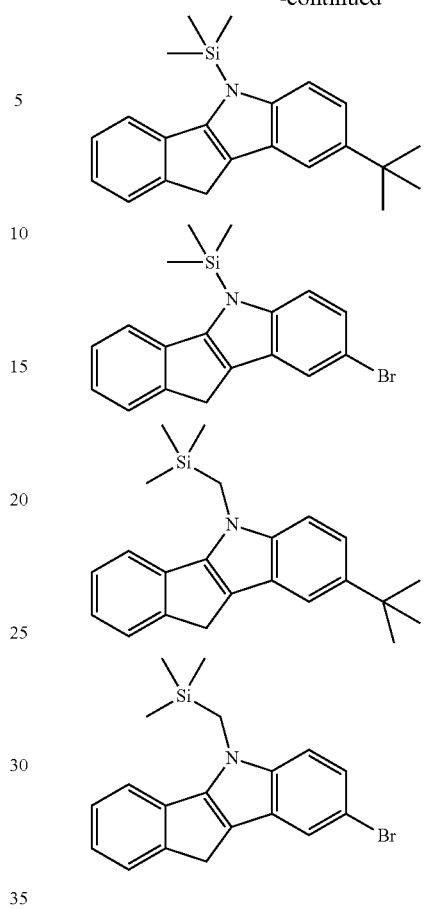
The structure represented by Chemical Formula 7b may be a structure represented by any one of the following structural formulae, but it is not limited to or by them.
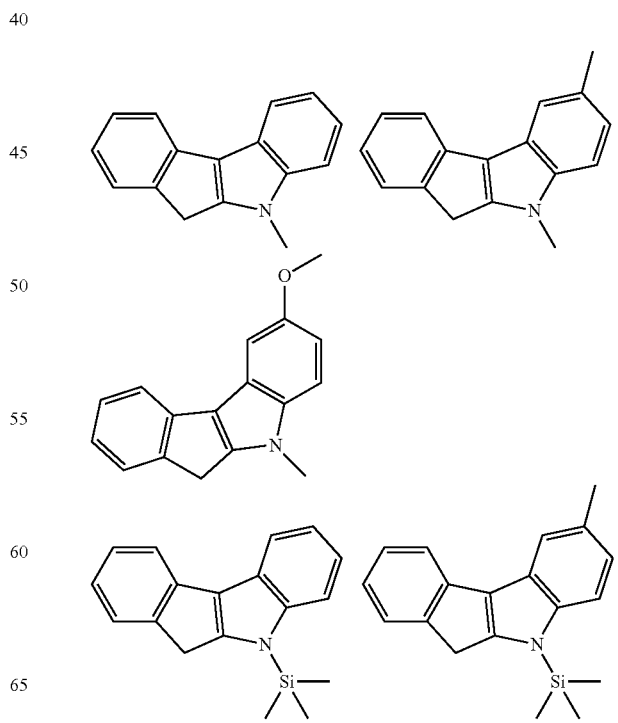

-continued
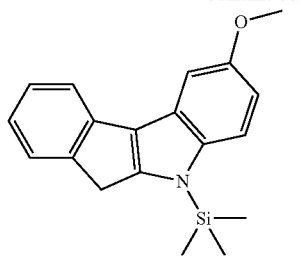
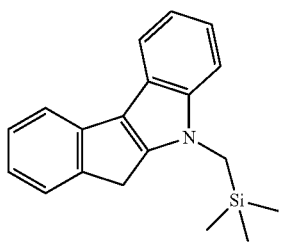
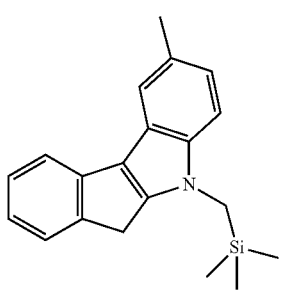
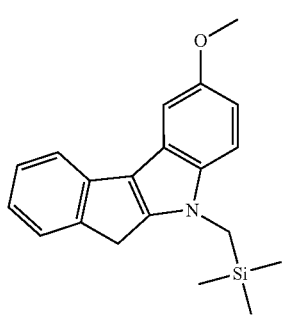
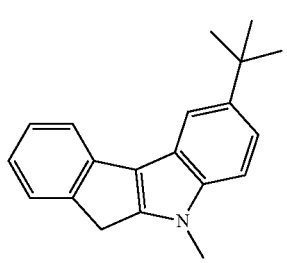
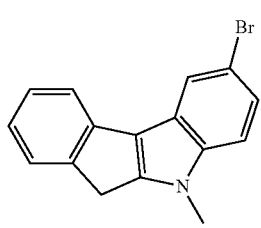
-continued
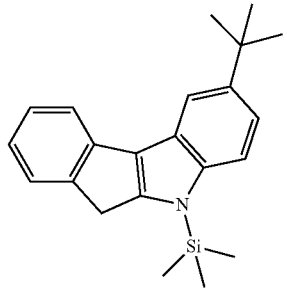
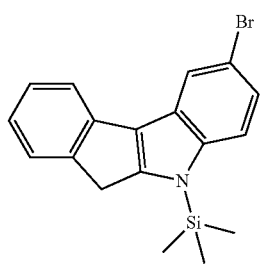
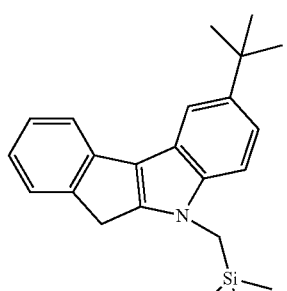
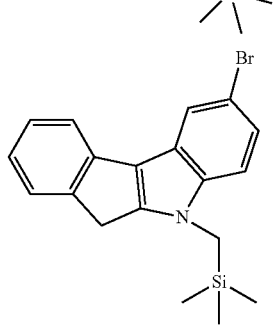
The structure represented by Chemical Formula 7c may be a structure represented by any one of the following structural formulae, but it is not limited to or by them.
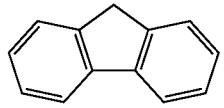
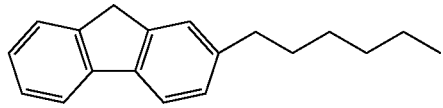
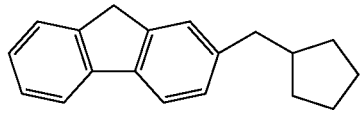

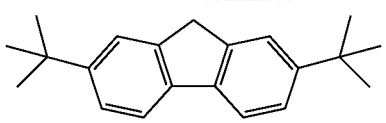
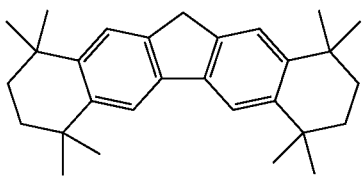
In addition, a concrete example of the metallocene compound represented by Chemical Formula 6 may be a compound represented by any one of the following structural formulae, but it is not limited to or by them.
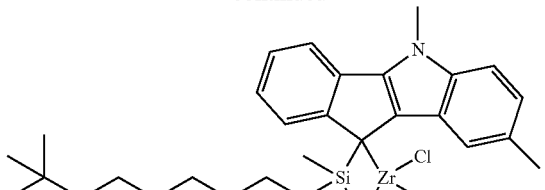
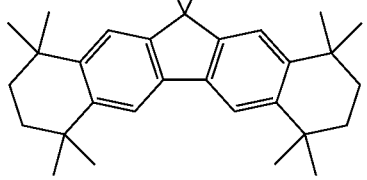
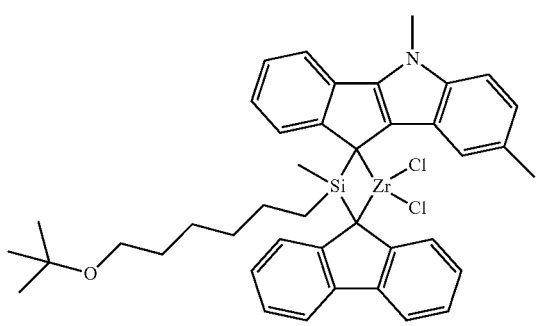
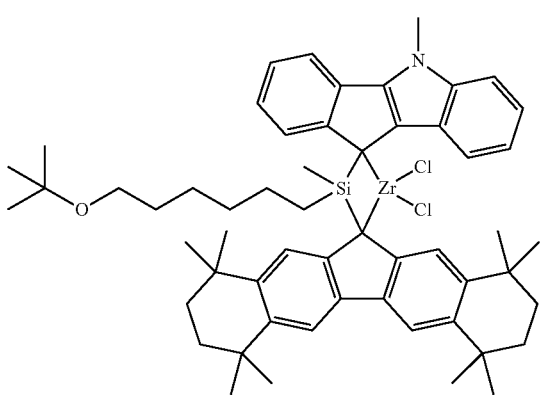
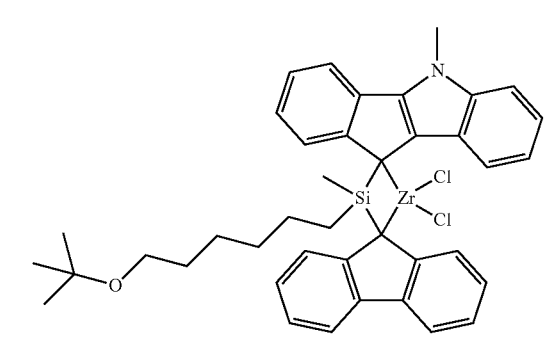
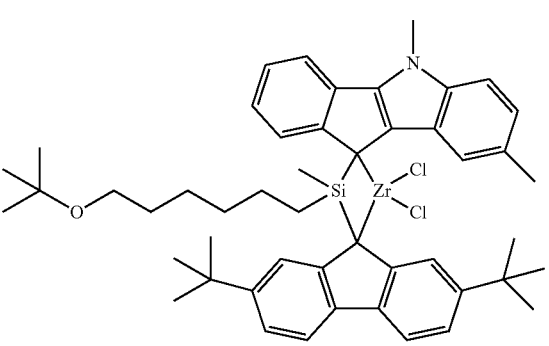
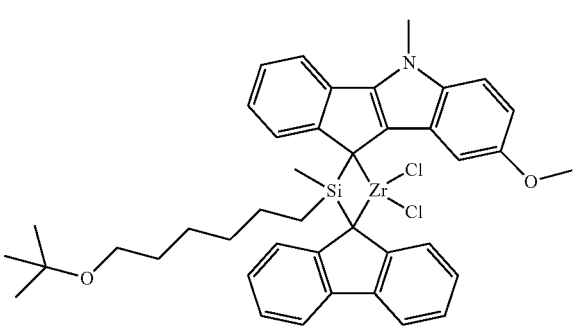
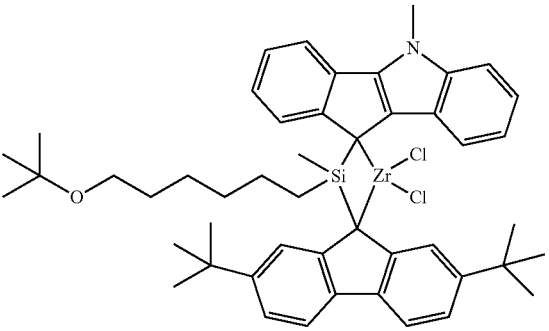

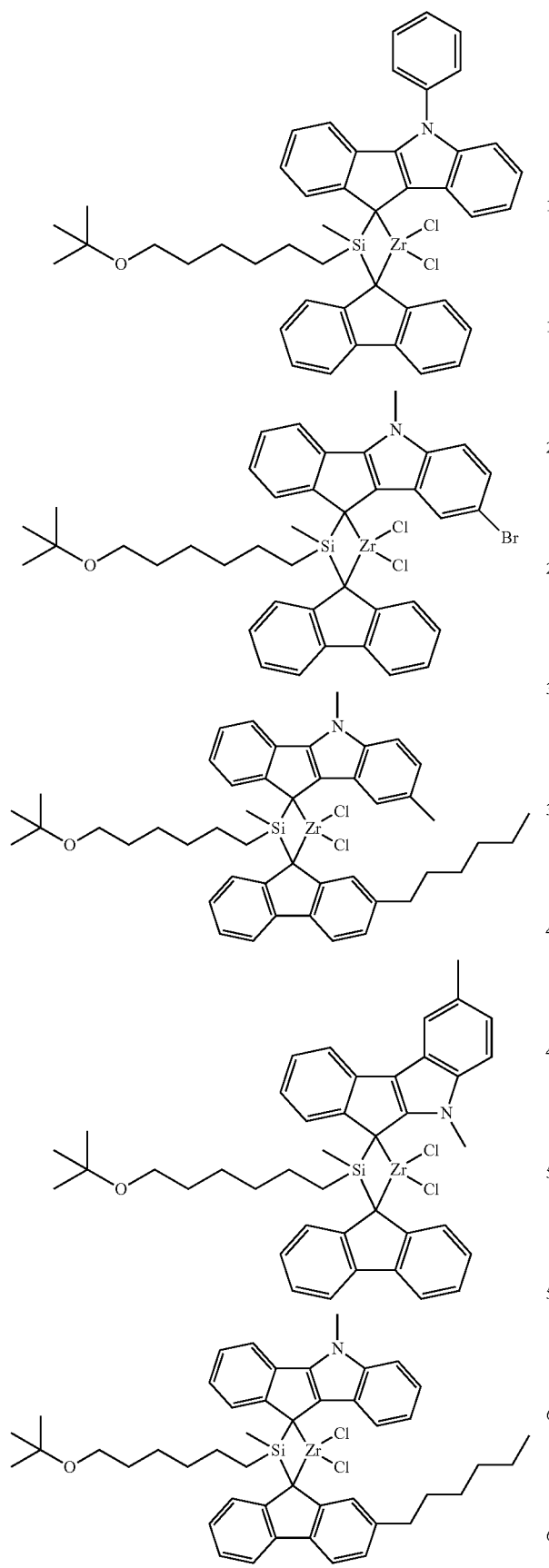
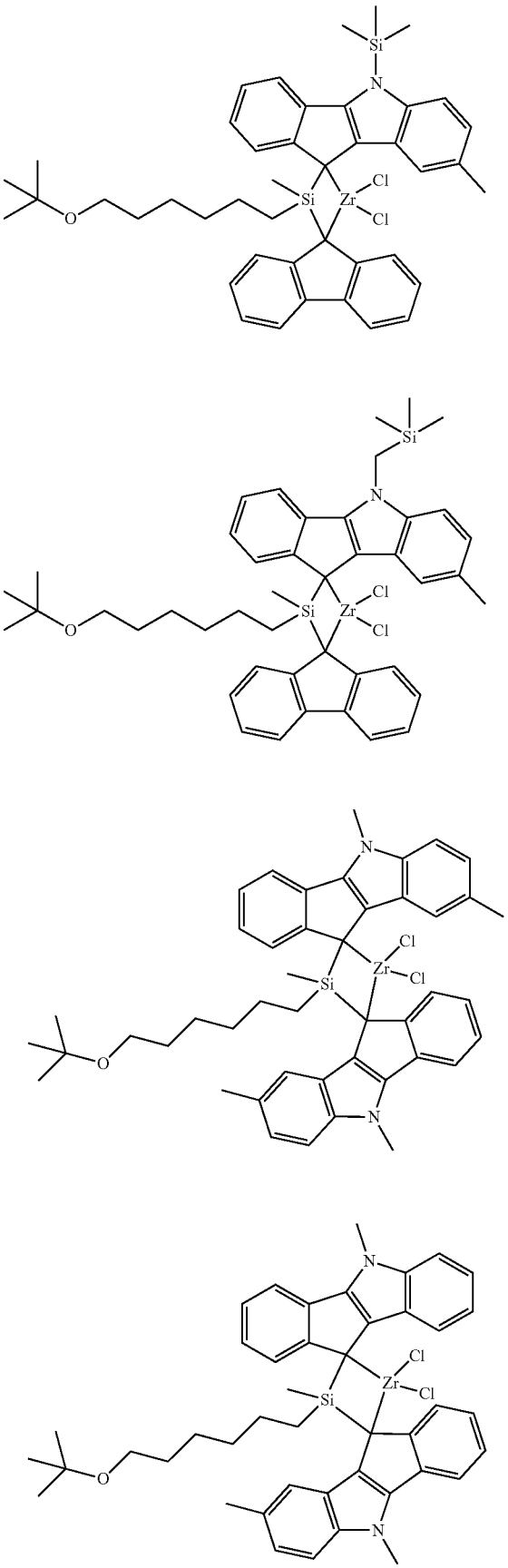

-continued

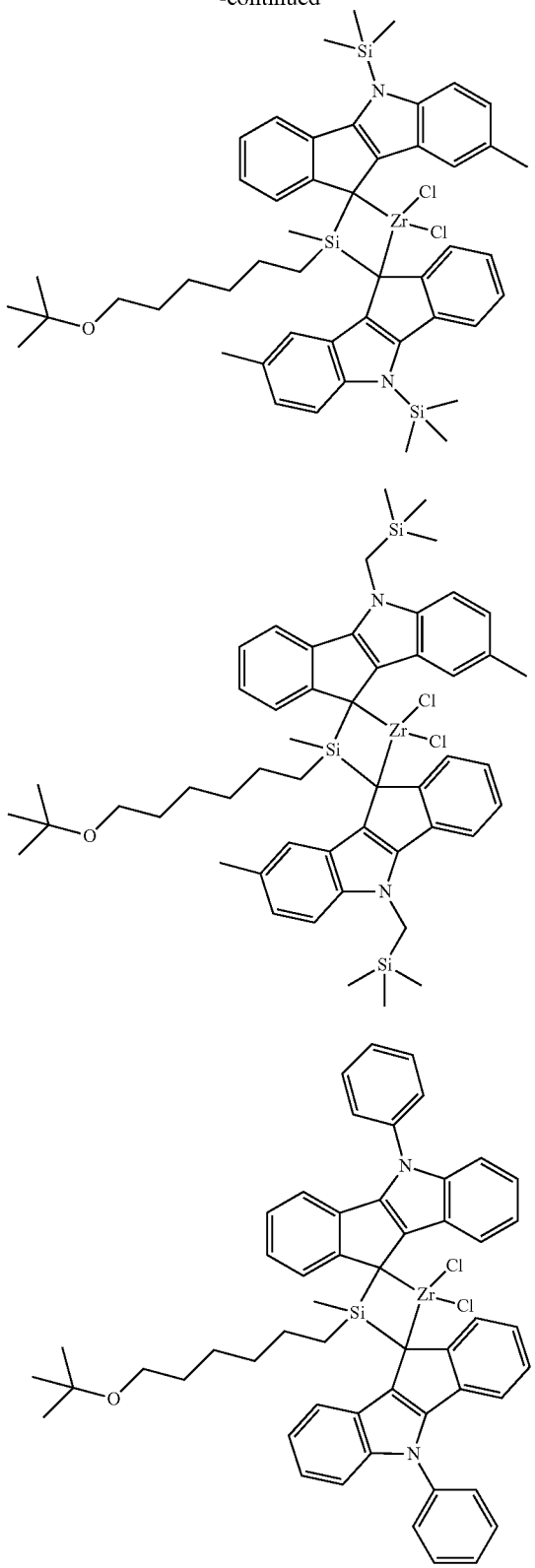

The preparation method of the supported metallocene catalyst according to the present invention may further include a step which can be commonly carried out in the technical field to which the present invention pertains before or after each step, in addition to the steps disclosed above, and the polymerization method of the present invention is not limited to or by the steps.

According to a preferable embodiment of the present invention, when one or more metallocene compounds are used, said metallocene compounds may be sequentially loaded on the silica carrier.

The present invention may further load a borate compound as the second cocatalyst on the carrier. That is, the present invention may further include a step of loading the borate compound as the second cocatalyst on the silica carrier on which the alkylaluminoxane and one or more metallocene compounds are supported.

Therefore, according to one embodiment of the present invention, it is possible that the alkylaluminoxane, the first cocatalyst, is loaded on the carrier, the borate compound, the second cocatalyst, is loaded thereon, and then one or more metallocene compounds are loaded thereon. If the second cocatalyst is included as the supported metallocene catalyst, the polymerization activity of the final catalyst prepared may be improved.

The borate compound, the second cocatalyst, may include a tri-substituted ammonium salt type of borate compound, a dialkyl ammonium salt type of borate compound, or a tri-substituted phosphonium salt type of borate compound. As an example of the second cocatalyst, there is a tri-substituted ammonium salt type of a borate compound such as trimethylammonium tetraphenylborate, methyldioctadecylammonium tetraphenylborate, triethylammonium tetraphenylborate, tripropylammonium tetraphenylborate, tri(n-butyl)ammonium tetraphenylborate, methyltetradecyclooctadecylammonium tetraphenyl borate, N,N-dimethylanilinium tetraphenylborate, N,N-diethylanilinium tetraphenylborate, N,N-dimethyl(2,4,6-trimethylanilinium)tetraphenylborate, trimethylammonium tetrakis(pentafluorophenyl)borate, methylditetradecylammonium tetrakis(pentaphenyl)borate, methyldioctadecylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(secondary-butyl)ammoniumtetrakis(pentafluorophenyl)borate, N,N-dimethylanilinium tetrakis(pentafluorophenyl)borate, N,N-diethylaniliniumtetrakis(pentafluorophenyl)borate, N,N-dimethyl(2,4,6-trimethylanilinium)tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, tri(n-butyl)ammonium tetrakis(2,3,4,6-tetrafluorophenyl)borate, N,N-dimethylanilinium tetrakis(2,3,4,6-tetrafluorophenyl)borate, N,N-diethylanilinium tetrakis(2,3,4,6-tetrafluorophenyl)borate, or N,N-dimethyl-(2,4,6-trimethylanilinium) tetrakis(2,3,4,6-tetrafluorophenyl)borate; a dialkyl ammonium salt type of borate compound such as dioctadecylammonium tetrakis(pentafluorophenyl)borate, ditetradecylammonium tetrakis(pentafluorophenyl)borate, or dicyclohexylammonium tetrakis(pentafluorophenyl)borate; or a tri-substituted phosphonium salt type of borate compound such as triphenylphosphonium tetrakis(pentafluorophenyl)borate, methyldioctadecylphosphonium tetrakis(pentafluorophenyl)borate, or tri(2,6-dimethylphenyl)phosphonium tetrakis(pentafluorophenyl)borate.

The borate compound may be loaded in the amount of 0.01 to 1 mmol/g based on 1 g of the silica carrier. Further, when the borate compound is used as the second cocatalyst in the present invention, the loading order is not particularly limited. For example, the borate compound may be finally loaded on the silica carrier after loading one or more metallocene compounds on the same. And, selectively, the present invention may be carried out according to the order of loading the alkylaluminoxane on the silica carrier, loading the borate compound, and then sequentially loading one more metallocene compounds.

In addition, according to another embodiment of the present invention, a preparation method of a polyolefin including the step of carrying out a polymerization reaction of an olefinic monomer in the presence of the supported metallocene catalyst is provided.

The preparation method of a polyolefin may include the steps of preparing the supported metallocene catalyst, and carrying out a polymerization reaction of an olefinic monomer in the presence of the supported metallocene catalyst.

The supported metallocene catalyst according to the present invention may be used for a polymerization reaction by itself, or the supported metallocene catalyst may be used in the form of a preliminarily polymerized catalyst prepared by a contact reaction with the olefinic monomer. For example, a preliminarily polymerized catalyst prepared by bringing the catalyst into contact with the olefinic monomer such as ethylene, propylene, 1-butene, 1-hexene, 1-octene, and so on may be used.

The supported metallocene catalyst may be injected into the reactor in the form of being diluted in a C5-C12 aliphatic hydrocarbon solvent (for example, pentane, hexane, heptane, nonane, decane, and isomers thereof), an aromatic hydrocarbon solvent such as toluene and benzene, or a chlorinated hydrocarbon such as dichloromethane and chlorobenzene. At this time, it is preferable to use the solvent after eliminating a small amount of water or air which can act as a catalyst poison therefrom by adding a small amount of alkylaluminum to the same.

The polymerization reaction may be homopolymerization of one olefinic monomer or a copolymerization of 2 or more monomers carried out by using a continuous slurry polymerization reactor, a loop slurry reactor, a gas phase reactor, or a solution reactor.

The polymerization of the olefinic monomer may be carried out at a temperature of about 25 to about 500° C. and a pressure of about 1 to about 100 kgf/cm$^2$ for about 1 to about 24 h. At this time, the polymerization reaction temperature may be about 25 to about 500° C., preferably about 25 to about 200° C., and more preferably about 50 to about 100° C., and the polymerization reaction pressure may be about 1 to about 100 kgf/cm$^2$, preferably about 1 to about 50 kgf/cm$^2$, and more preferably about 5 to about 40 kgf/cm$^2$.

The olefinic monomer may be selected according to the kind of the polyolefin to be prepared, and it is preferable to use one or more olefinic monomers selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidenenorbornene, phenylnorbornene, vinylnorbornene, dicyclopentadiene, 1,4-butadiene, 1-5-pentadiene, 1,6-hexadiene, styrene, alpha-methylstyrene, divinylbenzene, and 3-chloromethylstyrene.

The polyolefin prepared by above method can show the effect of increasing the bulk density and the settling efficiency while maintaining the activity equal to or higher than the prior art. Preferably, the bulk density of the polyolefin is 0.3 to 0.5 g/cm$^3$, and the settling efficiency of the polyolefin, defined by the following equation, may be 20 to 80%.

Settling efficiency=amount of ethylene used/
(amount of ethylene used+solvent content)×
100%  [Calculation Equation 1]

Furthermore, the polyolefin prepared by using the supported metallocene catalyst of the present invention may have a weight average molecular weight of 50,000 to 2,000,000.

Hereinafter, the present invention provides preferable examples for elucidating the present invention. However, the following examples are only for understanding the present invention, and the range of the present invention is not limited to or by them.

Comparative Examples 1 to 4 and Examples 1 to 11

Silica (manufacturer: Grace Davison, product name: Sylopol 952) was used as the carrier, and it was calcined at 200° C. for 10 h.

After putting 100 ml of toluene and 10 g of the silica in a glass reactor and dispersing the same, a part of methylaluminoxane (MAO) solution was dividedly added thereto as the first cocatalyst and the former reaction was carried out at the higher temperature. The rest of methylaluminoxane was then added thereto at the lower temperature and the latter reaction was carried out. Subsequently, unreacted methylaluminoxane was eliminated therefrom by washing the same with a sufficient amount of toluene (amount of MAO loaded: 5 mmol/g carrier (former reaction), 3 mmol/g carrier (latter reaction)). At this time, the input of the methylaluminoxane and the metallocene compound, the temperature when loading the cocatalyst, and the Al/Si content in the supported metallocene catalyst were as shown in the following Table 1.

After adding a toluene solution in which a metallocene compound (low molecular weight metallocene) was dissolved to the silica on which methylaluminoxane was loaded, the reaction was carried out at 40° C. for 1 h while stirring. A toluene solution in which a metallocene compound (high molecular weight metallocene) was dissolved was then added thereto and the reaction was carried out at 40° C. for 1 h while stirring (amount of the metallocene compound loaded: 0.2 mmol/g carrier). After washing the same with a sufficient amount of toluene, the supported metallocene catalyst was obtained as a solid powder by vacuum drying the same.

In the cases of Examples 5 and 6, the supported metallocene catalysts were prepared by further loading the second cocatalyst (a borate compound).

Figure 2:
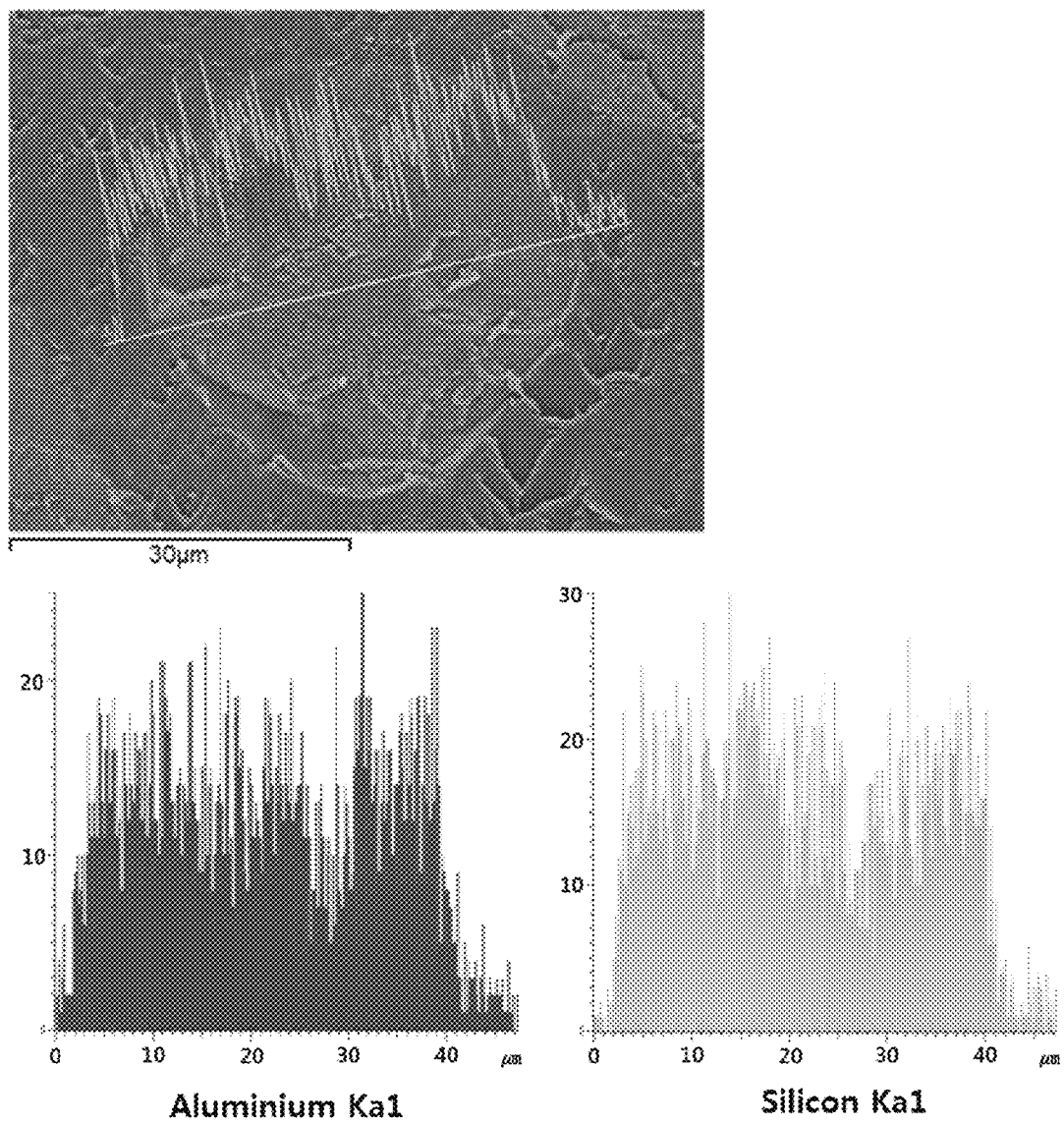
FIG. 2 represents the result of the shape analysis obtained through the depth profile of the inside of the supported catalyst of Example 2.

The result of the shape analysis obtained through the depth profile of the inside of the supported catalyst of Comparative Example 1 is shown in FIG. 1, and the result of the shape analysis obtained through the depth profile of the inside of the supported catalyst of Example 2 is shown in FIG. 2.

For analyzing the components inside the supported catalyst, an FESEM SU-8020 system and EDS were used. After molding the specimen in epoxy resin for preconditioning the same, the specimen was cut with a microtome and the cross-section was observed.

TABLE 1

| Classification | Silica | MAO | Low molecular weight metallocene (Cp derivative) | High molecular weight metallocene (CGC type catalyst (b)) Mmol/g-SiO$_2$ | High molecular weight metallocene (ansa catalyst (b)) | Borate cocatalyst | Temp (°C.) | Al/Si content (wt %) Inner layer | Al/Si content (wt %) Outer layer |
|---|---|---|---|---|---|---|---|---|---|
| Comparative Example 1 | Sr2410 | 8 | 0.1 | 0.1 | | | 40 | 24.1 | 41.5 |
| Comparative Example 2 | Sylopol 952 | 13 | 0.1 | 0.1 | | | 40 | 35.2 | 56.4 |
| Comparative Example 3 | Sylopol 952 | 13 | 0.1 | 0.1 | | | 80 | 42.2 | 49.6 |
| Comparative Example 4 | Sylopol 952 | 13 | 0.1 | | | | 80 | 38.3 | 43.5 |
| Example 1 | SP2410 | 5 + 3 | 0.1 | 0.1 | | | 80, R.T | 29.5 | 43.5 |
| Example 2 | Sylopol 952 | 9 + 4 | 0.1 | 0.1 | | | 80, R.T | 54.4 | 46.0 |
| Example 3 | Sylopol 952 | 9 + 4 | 0.1 | | | | 80, R.T | 49.9 | 42.8 |
| Example 4 | Sylopol 952 | 9 + 4 | 0.1 | | 0.1 | | 80, R.T | 55.2 | 48.9 |
| Example 5 | Sylopol 952 | 9 + 4 | 0.1 | 0.1 | | AB 0.2 | 80, R.T | 50.8 | 45.6 |
| Example 6 | Sylopol 952 | 9 + 4 | 0.1 | 0.1 | | TB 0.2 | 80, R.T | 54.3 | 47.7 |
| Example 7 | Sylopol 952 | 10 + 3 | 0.1 | 0.1 | | | 80, R.T | 47.7 | 44.2 |
| Example 8 | Sylopol 952 | 11 + 2 | 0.1 | 0.1 | | | 80, R.T | 41.3 | 44.9 |
| Example 9 | Sylopol 952 | 11 + 2 | 0.1 | 0.1 | | | 80, R.T | 44.0 | 41.0 |
| Example 10 | Sylopol 952 | 11 + 2 | 0.1 | 0.1 | | | 100, 50 | 53.1 | 54.4 |
| Example 11 | Sylopol 952 | 11 + 2 | 0.1 | 0.1 | | | 120, 50 | 50.9 | 50.7 |

Note)
In Table 1,
Low molecular weight metallocene (Cp derivative): bis(n-butylcyclopentadienyl)-zirconium dichloride
High molecular weight metallocene (CGC type): t-butoxyhexylmethylsilyl(N-t-butylamido)(2,3,4,5-tetramethylcyclopentadienyl)-tit aniumdichloride
High molecular weight metallocene (ansa type): 10-((9-fluorenyl)-t-butoxyhexylmethylsilyl)(5,8-dimethyl-4b,5,9b,10-tetrahydroindeno[1,2-b]indolyl)-zirconium dichloride
AB: N,N'-dimethylanilinium tetrakis(pentafluorophenyl)borate
TB: Trityl tertakis(pentafluorophenyl)borate Referring to the results in Table 1 and FIGS. 1 and 2, it is recognizable from the results of the shape analysis obtained through the depth profile of the inside of the supported metallocene catalysts that Al is deeply and well loaded into the silica according to the shape of the silica in Examples 1 to 11 in comparison to Comparative Examples 1 to 4. Further, it is recognizable from the results of quantitative analysis on the inner layer of the supported metallocene catalyst that the amount of Al loaded inside the catalyst differs according to the temperature in the examples and comparative examples (FIG. 1 and FIG. 2).

Through this, it is possible to prepare the polymer having high bulk density and to increase the productivity by using the highly active catalyst prepared according to the novel loading method of the present invention.

Examples 12 to 14 and Comparative Example 5

After respectively putting the supported metallocene catalysts prepared in Examples 1 to 4 and the existing common metallocene catalyst of Comparative Example 1 in a loop slurry reactor, the polyethylene was prepared while continuously providing a gas phase ethylene monomer. At this time, the polyolefin of Comparative Example 5 was prepared by using the catalyst of Comparative Example 1.

The results of polymerization according to Examples 12 to 14 and Comparative Example 5 are listed in the following Table 2. Here, S.E means the settling efficiency, and it was measured by the following equation.

Settling efficiency=amount of ethylene used/
(amount of ethylene used+solvent content)×
100%         [Calculation Equation 1]

TABLE 2

| | Activity (Mt-PE/kg-SiO$_2$) | C2 (kg) | B.D (g/cm$^3$) | S.E (%) |
|---|---|---|---|---|
| Example 12 | 6.0 | 25 | 0.41 | 47.0 |
| Example 13 | 5.1 | 24 | 0.40 | 47.0 |
| Example 14 | 5.0 | 25 | 0.41 | 47.0 |
| Comparative Example 5 | 2.9 | 17 | 0.35 | 37.8 |

Note)
B.D: bulk density

Referring to the results in Table 2, Comparative Example 5 using the existing common supported catalyst could prepare only the polyethylene having low bulk density (B.D) and settling efficiency (S.E) because of its low catalytic activity. However, Examples 10 to 12 could prepare the polyethylene with improved bulk density while maintaining the high catalytic activity.

Thus far, specific features of the present invention are described, but such specific descriptions represent only preferable examples, and it is obvious to a person skilled in the related art that the scope of the present invention is not limited to or by this. Therefore, the actual scope of the present invention will be defined by Claims annexed with this description and their equivalents.

The invention claimed is:

1. A method of preparing a supported metallocene catalyst, including the steps of:
preparing a silica carrier;
loading an alkylaluminoxane on the inside and the surface of the silica carrier by bringing the silica carrier into contact with the alkylaluminoxane, a cocatalyst component; and
sequentially loading one or more metallocene compounds on the silica carrier on which the alkylaluminoxane is loaded,
wherein the alkylaluminoxane is dividedly loaded at different temperatures by a separate-input method, and
wherein the amount of the alkylaluminoxane loaded on the silica carrier is 5 to 15 mmol/g based on 1 g of the silica carrier.

2. The method of preparing a supported metallocene catalyst according to claim 1, wherein the alkylaluminoxane is loaded on the silica carrier by the separate-input method of primarily loading a part of the whole input of the alkylaluminoxane at the temperature of 50° C. or more and secondarily loading the rest of the whole input of the same at the temperature of 40° C. or less.

3. The method of preparing a supported metallocene catalyst according to claim 1, wherein the silica carrier on which the alkylaluminoxane is loaded is obtained by the method of primarily loading 50 to 90 wt % of the whole input of the alkylaluminoxane on the silica carrier and carrying out the former reaction at 50 to 150° C., and secondarily loading the rest of the alkylaluminoxane on the silica carrier and carrying out the latter reaction at −10 to 40° C.

4. The method of preparing a supported metallocene catalyst according to claim 1, wherein the supported metallocene catalyst is composed of: an outer layer including the area from each surface to a 1/3 position of the particle diameter toward the center and an inner layer including the rest of the area from the 1/3 position of the particle diameter to the center, in the cross-section of the supported catalyst particle, and includes the silica carrier on which the inside and surface thereof the alkylaluminoxane is loaded; and one or more metallocene compounds loaded on the silica carrier, and
the content ratio (wt %) of Al/Si elements of the inner layer is 65% or more compared to the content ratio (wt %) of Al/Si elements of the outer layer.

5. The method of preparing a supported metallocene catalyst according to claim 1, wherein the content ratio (wt %) of Al/Si elements of the inner layer is 90 to 150% compared to the content ratio (wt %) of Al/Si elements of the outer layer.

6. The method of preparing a supported metallocene catalyst according to claim 1, wherein the metallocene compound is one or more compounds selected from the group consisting of a metallocene compound including the combination of a non-bridge Cp and a Cp type, a metallocene compound including the combination of a Si bridge Cp and a Cp type, a metallocene compound including the combination of a C bridge Cp and a Cp type, a metallocene compound including the combination of a Si bridge Cp and an amine type, a metallocene compound including the combination of an ethylene bridge Cp and a Cp type, a metallocene compound including the combination of a phenylene bridge Cp and an amine type, and a metallocene compound including a C—C bridge, a Si—C bridge, or a Si—Si bridge.

7. The method of preparing a supported metallocene catalyst according to claim 1, wherein the metallocene compound is one or more compounds selected from the group consisting of the compounds represented the following Chemical Formulae 1 to 6:

$$(Cp^1R^a)_n(Cp^2R^b)M^1Z^1_{3-n}$$ [Chemical Formula 1]

wherein, in Chemical Formula 1,
$M^1$ is a group 4 transition metal;
$Cp^1$ and $Cp^2$ are the same as or different from each other, and are independently any one selected from the group consisting of cyclopentadienyl, indenyl, 4,5,6,7-tetrahydro-1-indenyl, and a fluorenyl radical, and they may be substituted with a C1-C20 hydrocarbon;
$R^a$ and $R^b$ are the same as or different from each other, and are independently hydrogen, a C1-C20 alkyl, a C1-C10 alkoxy, a C2-C20 alkoxyalkyl, a C6-C20 aryl, a C6-C10 aryloxy, a C2-C20 alkenyl, a C7-C40 alkylaryl, a C7-C40 arylalkyl, a C8-C40 arylalkenyl, or a C2-C10 alkynyl;
$Z^1$ is a halogen, a C1-C20 alkyl, a C2-C10 alkenyl, a C7-C40 alkylaryl, a C7-C40 arylalkyl, a C6-C20 aryl, a substituted or non-substituted C1-C20 alkylidene, a substituted or non-substituted amino group, a C2-C20 alkylalkoxy, or a C7-C40 arylalkoxy; and
n is 1 or 0, $$(Cp^3R^c)_mB^1(Cp^4R^d)M^2Z^2_{3-m}$$ [Chemical Formula 2]

wherein, in Chemical Formula 2,
$M^2$ is a group 4 transition metal;
$Cp^3$ and $Cp^4$ are the same as or different from each other, and are independently any one selected from the group consisting of cyclopentadienyl, indenyl, 4,5,6,7-tetrahydro-1-indenyl, and a fluorenyl radical, and they may be substituted with a C1-C20 hydrocarbon;
$R^c$ and $R^d$ are the same as or different from each other, and are independently hydrogen, a C1-C20 alkyl, a C1-C10 alkoxy, a C2-C20 alkoxyalkyl, a C6-C20 aryl, a C6-C10 aryloxy, a C2-C20 alkenyl, a C7-C40 alkylaryl, a C7-C40 arylalkyl, a C8-C40 arylalkenyl, or a C2-C10 alkynyl;
$Z^2$ is a halogen, a C1-C20 alkyl, a C2-C10 alkenyl, a C7-C40 alkylaryl, a C7-C40 arylalkyl, a C6-C20 aryl, a substituted or non-substituted C1-C20 alkylidene, a substituted or non-substituted amino group, a C2-C20 alkylalkoxy, or a C7-C40 arylalkoxy;
$B^1$ is one or more radicals including a carbon, germanium, silicon, phosphorus, or nitrogen atom, or a combination thereof, which crosslink the $Cp^3R^c$ ring and the $Cp^4R^d$ ring or crosslink one $Cp^4R^d$ ring with $M^2$; and
m is 1 or 0, $$(Cp^5R^e)B^2(J)M^3Z^3_2$$ [Chemical Formula 3]

wherein, in Chemical Formula 3,

M³ is a group 4 transition metal;

Cp⁵ is any one selected from the group consisting of cyclopentadienyl, indenyl, 4,5,6,7-tetrahydro-1-indenyl, and a fluorenyl radical, and it may be substituted with a C1-C20 hydrocarbon;

$R^e$ is hydrogen, a C1-C20 alkyl, a C1-C10 alkoxy, a C2-C20 alkoxyalkyl, a C6-C20 aryl, a C6-C10 aryloxy, a C2-C20 alkenyl, a C7-C40 alkylaryl, a C7-C40 arylalkyl, a C8-C40 arylalkenyl, or a C2-C10 alkynyl;

Z³ is a halogen, a C1-C20 alkyl, a C2-C10 alkenyl, a C7-C40 alkylaryl, a C7-C40 arylalkyl, a C6-C20 aryl, a substituted or non-substituted C1-C20 alkylidene, a substituted or non-substituted amino group, a C2-C20 alkylalkoxy, or a C7-C40 arylalkoxy;

B² is one or more radicals including a carbon, germanium, silicon, phosphorus, or nitrogen atom, or a combination thereof, which crosslink the Cp⁵Rᵉ ring with J; and J is any one selected from the group consisting of $NR^f$, O, $PR^f$, and S, where $R^f$ is a C1-C20 alkyl, aryl, substituted alkyl, or substituted aryl,

[Chemical Formula 4]

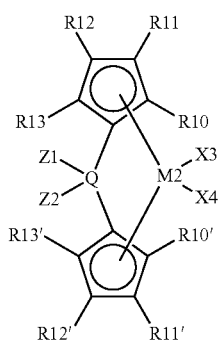

wherein, in Chemical Formula 4,

R10 to R13 and R10' to R13' are the same as or different from each other, and are independently hydrogen, a C1-C20 alkyl group, a C2-C20 alkenyl group, a C6-C20 aryl group, a C7-C20 alkylaryl group, a C7-C20 arylalkyl group, or a C1-C20 amine group, and 2 or more adjacent groups among R10 to R13 and R10' to R13' may be connected to each other and form one or more aliphatic rings, aromatic rings, or hetero rings;

Z1 and Z2 are the same as or different from each other, and are independently hydrogen, a C1-C20 alkyl group, a C3-C20 cycloalkyl group, a C1-C20 alkoxy group, a C6-C20 aryl group, a C6-C10 aryloxy group, a C2-C20 alkenyl group, a C7-C40 alkylaryl group, or a C7-C40 arylalkyl group;

Q is a C1-C20 alkylene group, a C3-C20 cycloalkylene group, a C6-C20 arylene group, a C7-C40 alkylarylene group, or a C7-C40 arylalkylene group;

M2 is a group 4 transition metal; and

X3 and X4 are the same as or different from each other, and are independently a halogen, a C1-C20 alkyl group, a C2-C10 alkenyl group, a C6-C20 aryl group, a nitro group, an amido group, a C1-C20 alkylsilyl group, a C1-C20 alkoxy group, or a C1-C20 sulfonate group,

[Chemical Formula 5]

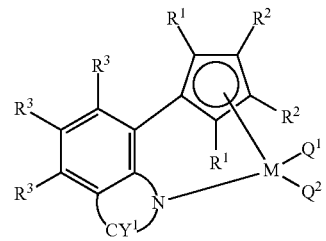

wherein, in Chemical Formula 5,

R¹ and R² are the same as or different from each other, and are independently hydrogen, a C1-C20 alkyl, a C2-C20 alkenyl, a C6-C20 aryl, a C6-C20 silyl, a C7-C20 alkylaryl, a C7-C20 arylalkyl, or a metalloid of a group 4 metal substituted with a hydrocarbyl, and R¹ and R², or two R²s, may be connected to each other and form a ring by an alkylidine including a C1-C20 alkyl or a C6-C20 aryl;

R³ is independently hydrogen, a halogen, a C1-C20 alkyl, a C2-C20 alkenyl, a C6-C20 aryl, a C7-C20 alkylaryl, a C7-C20 arylalkyl, a C1-C20 alkoxy, a C6-C20 aryloxy, or an amido, and 2 or more groups among R³s may be connected to each other and form an aliphatic ring or an aromatic ring;

CY¹ is a substituted or non-substituted aliphatic or aromatic ring, and the substituent in CY¹ is a halogen, a C1-C20 alkyl, a C2-C20 alkenyl, a C6-C20 aryl, a C7-C20 alkylaryl, a C7-C20 arylalkyl, a C1-C20 alkoxy, a C6-C20 aryloxy, or an amido, and 2 or more groups of the substituents may be connected to each other and form an aliphatic ring or an aromatic ring when there is a plurality of substituents;

M is a group 4 transition metal; and

Q¹ and Q² are independently a halogen, a C1-C20 alkyl, a C2-C20 alkenyl, a C6-C20 aryl, a C7-C20 alkylaryl, a C7-C20 arylalkyl, a C1-C20 alkylamido, a C6-C20 arylamido, or a C1-C20 alkylidene,

[Chemical Formula 6]

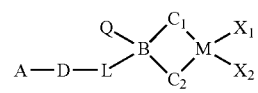

wherein, in Chemical Formula 6,

A is hydrogen, a halogen, a C1-C20 alkyl group, a C2-C20 alkenyl group, a C6-C20 aryl group, a C7-C20 alkylaryl group, a C7-C20 arylalkyl group, a C1-C20 alkoxy group, a C2-C20 alkoxyalkyl group, a C3-C20 heterocycloalkyl group, or a C5-C20 heteroaryl group;

D is —O—, —S—, —N(R)—, or —Si(R)(R')—, where R and R' are the same as or different from each other, and are independently hydrogen, a halogen, a C1-C20 alkyl group, a C2-C20 alkenyl group, or a C6-C20 aryl group;

L is a C1-C10 linear or branched alkylene group;

B is carbon, silicon, or germanium;

Q is hydrogen, a halogen, a C1-C20 alkyl group, a C2-C20 alkenyl group, a C6-C20 aryl group, a C7-C20 alkylaryl group, or a C7-C20 arylalkyl group;

M is a group 4 transition metal;

X₁ and X₂ are the same as or different from each other, and are independently a halogen, a C1-C20 alkyl group, a C2-C10 alkenyl group, a C6-C20 aryl group, a nitro group, an amido group, a C1-C20 alkylsilyl group, a C1-C20 alkoxy group, or a C1-C20 sulfonate group; and $C_1$ and $C_2$ are the same as or different from each other, and are independently represented by any one of the following Chemical Formula 7a, Chemical Formula 7b, or Chemical Formula 7c, except that both of C1 and C2 are Chemical Formula 7c,

[Chemical Formula 7a]

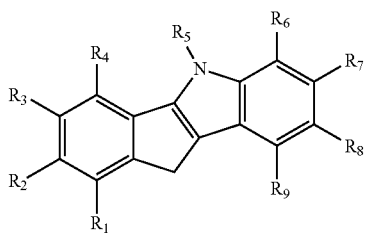

[Chemical Formula 7b]

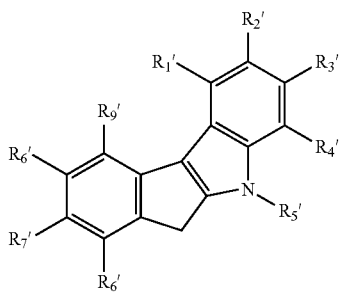

[Chemical Formula 7c]

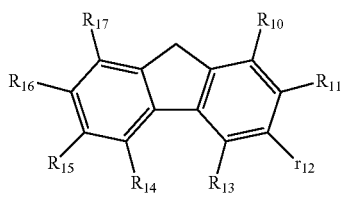

wherein, in Chemical Formulae 7a, 7b, and 7c, R1 to R17 and R1' to R9' are the same as or different from each other, and are independently hydrogen, a halogen, a C1-C20 alkyl group, a C2-C20 alkenyl group, a C1-C20 alkylsilyl group, a C1-C20 silylalkyl group, a C1-C20 alkoxysilyl group, a C1-C20 alkoxy group, a C6-C20 aryl group, a C7-C20 alkylaryl group, or a C7-C20 arylalkyl group, and 2 or more adjacent groups among R10 to R17 may be connected to each other and form a substituted or non-substituted aliphatic or aromatic ring.

8. The method of preparing a supported metallocene catalyst according to claim 1, wherein the silica carrier is one or more carriers selected from the group consisting of silica, silica-alumina, and silica-magnesia.

9. The method of preparing a supported metallocene catalyst according to claim 1, wherein the alkylaluminoxane is one or more compounds selected from the group consisting of methylaluminoxane, ethylaluminoxane, butylaluminoxane, and isobutylaluminoxane.

10. The method of preparing a supported metallocene catalyst according to claim 1, further including the step of loading a borate compound as a second cocatalyst on the silica carrier on which the alkylaluminoxane and one or more metallocene compounds are loaded.

11. The method of preparing a supported metallocene catalyst according to claim 10, wherein the borate compound includes a tri-substituted ammonium salt type of borate compound, a dialkyl ammonium salt type of borate compound, or a tri-substituted phosphonium salt type of borate compound.

12. A method of preparing a polyolefin, including the step of carrying out a polymerization reaction of an olefinic monomer in the presence of the supported metallocene catalyst prepared according to the method of claim 1.

13. The method of preparing a polyolefin according to claim 12, wherein the bulk density of the polyolefin is 0.1 to 0.8 g/cm$^3$.

14. The method of preparing a polyolefin according to claim 12, wherein a settling efficiency of the polyolefin, defined by Equation 1, is 20 to 80%:

Settling efficiency (%)=$A/(A+B)\times 100$,   [Calculation Equation 1]

wherein A is a total amount of the olefinic monomer used in the polymerization reaction, and B is an amount of a solvent used in the polymerization reaction.

* * * * *